United States Patent
Tsugihashi et al.

(10) Patent No.: US 9,421,471 B2
(45) Date of Patent: *Aug. 23, 2016

(54) STORAGE MEDIUM, GAME APPARATUS, GAME CONTROLLING METHOD AND GAME SYSTEM FOR CREATING AND EXCHANGING CHARACTER INFORMATION

(71) Applicant: Nintendo Co., Ltd., Kyoto (JP)

(72) Inventors: Kanako Tsugihashi, Kyoto (JP); Naonori Ohnishi, Kyoto (JP); Ryosuke Suzuki, Kyoto (JP); Minori Koike, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 306 days.

This patent is subject to a terminal disclaimer.

(21) Appl. No.: 13/849,620

(22) Filed: Mar. 25, 2013

(65) Prior Publication Data

US 2013/0217492 A1 Aug. 22, 2013

Related U.S. Application Data

(63) Continuation of application No. 12/805,773, filed on Aug. 19, 2010, now Pat. No. 8,454,435.

(30) Foreign Application Priority Data

Jun. 11, 2010 (JP) ................................. 2010-134434

(51) Int. Cl.
*A63F 13/00* (2014.01)
*A63F 13/69* (2014.01)
(Continued)

(52) U.S. Cl.
CPC .............. *A63F 13/69* (2014.09); *A63F 13/12* (2013.01); *A63F 13/213* (2014.09); *A63F 2300/1093* (2013.01); *A63F 2300/6009* (2013.01); *A63F 2300/69* (2013.01)

(58) Field of Classification Search
CPC ...... A63F 13/12; A63F 13/213; A63F 13/65; A63F 13/69; A63F 2300/69; A63F 2300/6009; A63F 2300/1093
See application file for complete search history.

(56) References Cited

U.S. PATENT DOCUMENTS 5,212,368 A * 5/1993 Hara .............................. 235/375
5,331,141 A * 7/1994 Kaneko ..................... 235/462.18
(Continued)

FOREIGN PATENT DOCUMENTS

JP 2000-308763 11/2000
JP 3094046 3/2003
(Continued)

OTHER PUBLICATIONS

The Official F-Zero GX Website [online]. Jul. 13, 2008 [retrieved Mar. 28, 2015]. Retrieved from the Internet: <URL:http://web.archive.org/web/20080820055206/http://f-zero.com/f-zero_gx/customize/index.jsp>.*

(Continued)

*Primary Examiner* — Dmitry Suhol
*Assistant Examiner* — David Duffy
(74) *Attorney, Agent, or Firm* — Nixon & Vanderhye P.C.

(57) ABSTRACT

A game apparatus includes a CPU, and the CPU acquires character information data from another game apparatus by executing communication processing. Furthermore, the CPU calculates character information data from image data obtained by imaging a QR Code with a camera and acquires the same. The CPU generates a character on the basis of the character information data, and displays the generated character on a second LCD.

20 Claims, 15 Drawing Sheets

(51) Int. Cl.
*A63F 13/213* (2014.01)
*A63F 13/30* (2014.01)

(56) References Cited

U.S. PATENT DOCUMENTS

| | | | |
|---|---|---|---|
| 5,809,520 A * | 9/1998 | Edwards et al. | 711/115 |
| 6,354,943 B1 | 3/2002 | Miura | |
| 6,729,954 B2 | 5/2004 | Atsumi et al. | |
| 6,811,492 B1 | 11/2004 | Arakawa et al. | |
| 7,066,387 B2 * | 6/2006 | Itoh et al. | 235/382 |
| 7,069,044 B2 | 6/2006 | Okada et al. | |
| 7,147,561 B2 | 12/2006 | Takeuchi | |
| 7,811,174 B2 * | 10/2010 | Whitten et al. | 463/43 |
| 8,043,161 B2 * | 10/2011 | Nogami et al. | 463/43 |
| 2002/0088853 A1 * | 7/2002 | Itoh et al. | 235/382 |
| 2002/0145957 A1 * | 10/2002 | Han | G11B 27/322 369/47.12 |
| 2006/0083404 A1 | 4/2006 | Shimosato | |
| 2007/0155486 A1 * | 7/2007 | Futa et al. | 463/29 |
| 2008/0119279 A1 * | 5/2008 | Nogami et al. | 463/42 |

FOREIGN PATENT DOCUMENTS

| | | |
|---|---|---|
| JP | 2004-73576 | 3/2004 |
| JP | 2005-120579 | 5/2005 |
| JP | 2006-121185 | 5/2006 |
| JP | 2006-346123 | 12/2006 |
| JP | 2008-125678 | 6/2008 |

OTHER PUBLICATIONS

The Official F-Zero GX Website [online]. Jul. 13, 2008 [retrieved Mar. 28, 2015]. Retrieved from the Internet: <URL:http://web.archive.org/web/20080713064943/http://f-zero.com/ax-gx/index.jsp>.*

* cited by examiner (A) TOP VIEW (FOLDED STATE)

(B) LEFT SIDE VIEW (FOLDED STATE)

FIG. 4

CHARACTER INFORMATION

| |
|---|
| GENDER |
| BIRTHDAY |
| FAVORITE COLOR |
| FAVORITE FLAG |
| CHARACTER NAME (NICKNAME) |
| BODY HEIGHT ABD BODY SHAPE |
| CHARACTER ID |
| EACH PARTS AND ASSOCIATED INFORMATION |
| CREATOR NAME |
| CREATOR ID |
| VERSION OF CHARACTER |
| COPY ALLOWABLE FLAG |
| TRANSMISSION ALLOWABLE FLAG |
| NG WORD CHECK RESULT FLAG |
| REGION OF USING FONT |

(A) CHARACTER SELECTING SCREEN 100

(B) RECEIVED CHARACTER DISPLAYING SCREEN 200

(A) EXAMPLE 1 OF QR CODE

CHARACTER NAME (B) EXAMPLE 2 OF QR CODE (C) EXAMPLE 3 OF QR CODE

GENERIC NAME
OF CHARACTER (D) EXAMPLE 4 OF QR CODE

CHARACTER NAME (E) EXAMPLE 5 OF QR CODE

STORAGE MEDIUM, GAME APPARATUS, GAME CONTROLLING METHOD AND GAME SYSTEM FOR CREATING AND EXCHANGING CHARACTER INFORMATION

CROSS REFERENCE OF RELATED APPLICATIONS

This application is a continuation of U.S. Ser. No. 12/805,773, filed Aug. 19, 2010, now U.S. Pat. No. 8,454,435, which claims priority to Japanese Patent Application No. 2010-134434, filed Jun. 11, 2010, each of which is incorporated herein in its entirety.

BACKGROUND AND SUMMARY

1. Technical Field

The technology presented herein relates to a storage medium, a game apparatus, a game controlling method and a game system. More specifically, the present technology relates to a storage medium, a game apparatus, a game controlling method and a game system that generate a character.

2. Description of the Related Art

One example of the related art is disclosed in a Japanese Patent Application Laid-Open No. 2008-125678 [A63F 13/12, A63F 13/00] (Document 1) laid-open on Jun. 5, 2008. In the game system of the Document 1, character data are transferred among a plurality of game apparatus, and in each game apparatus, the received character data is used to acquire a new character.

However, in the game system of the Document 1, character data is transferred by communications, and thus, placing the game apparatus in an environment for making communications is an indispensable condition. Thus, a user who cannot create an environment for making communications could not acquire a new character.

Therefore, it is a primary feature of the example embodiments presented herein to provide a novel storage medium, a novel game apparatus, a novel game controlling method and a novel game system.

Furthermore, another feature of the present embodiments is to provide a storage medium, a game apparatus, a game controlling method and a game system that allows more users to acquire new characters.

A first embodiment is a storage medium storing a game program to be executed by a computer of a game apparatus having a communicator, an imager and a displayer. The game program causes the computer to function as a character data receiver, a code data acquirer, a character data calculator, a first character generator, and a game processor. The character data receiver receives character data from a predetermined computer connectable to the computer via the communicator. The code data acquirer acquires code data by imaging a predetermined image by the imager. The character data calculator calculates character data from the code data acquired by the code data acquirer. The first character generator generates a character corresponding to the character data received by the character data receiver or the character data calculated by the character data calculator. The game processor executes game processing by displaying the character generated by the first character generator on the displayer.

According to the first embodiment, a character can be acquired from the code data acquired by imaging a predetermined image with an imager, that is, a character can be acquired independent of a communication, and thus, more users or players can acquire new characters.

In a second embodiment the game program causes the computer to further function as a character data storager. The character data storager stores the character data received by the character data receiver or the character data calculated by the character data calculator in a character data memory area. The first character generator generates a character corresponding to predetermined character data stored in the character data memory area by the character data storager.

According to the second embodiment, the received or calculated character data is stored, and thus, a plurality of character data are stored, and a character corresponding to each of the characters can be generated.

In a third embodiment the game program causes the computer to further function as a character selector and a character data transmitter. The character selector selects the predetermined character data out of the character data stored in the character memory area in response to an operation by a user. The character data transmitter transmits to the predetermined computer the predetermined character data selected by the character selector by using the communicator.

According to the third embodiment, it is possible to transmit the character data to the predetermined computer.

In a fourth embodiment the game program causes the computer to further function as a character selector, a code data calculator, and a code data outputter. The character selector selects predetermined character data out of the character data stored in the character memory area in response to an operation by the user. The code data calculator calculates code data from the predetermined character data selected by the character selector. The code data outputter outputs the code data calculated by the code data calculator to the displayer. Thus, a predetermined image corresponding to the code data is displayed on the displayer.

According to the fourth embodiment, a predetermined image corresponding to the code data is displayed, and by making another game apparatus image the predetermined image, it is possible to give the character to this another game apparatus.

In a fifth embodiment the game program causes the computer to further function as a second character generator and a character displayer. The second character generator generates a character corresponding to at least one character data stored in the character memory area. The character displayer displays the character generated by the second character generator on the displayer. Thus, the character selector makes a user select a desired character from the characters displayed on the displayer by the character displayer, and selects, as the predetermined character data, character data corresponding to the desired character that is made to be selected by the user.

According to the fifth embodiment, the character is generated and displayed so as to be selected by the user, capable of making an easy selection.

In a sixth embodiment the code data calculator includes an encrypter which encrypts the predetermined character data selected by the character selector. The code data calculator further calculates the code data from the predetermined character data encrypted by the encrypter.

According to the sixth embodiment, the predetermined character data is encrypted, and thus, it is possible to prevent a character from being generated or displayed by an electronic appliance and a computer that are not intended.

In a seventh embodiment the character data calculator includes a decrypter which decrypts encrypted character data. The character data calculator calculates encrypted character data from the code data acquired by the code data acquirer and calculates character data after the encrypted character data is decrypted by the decrypter.

According to the seventh embodiment, the encrypted character data is decrypted, and thus, it is possible to generate and display a character.

In an eighth embodiment the computer is connectable with a predetermined external storage medium. For example, a general-purpose memory card, such as an SD card is attached. The game program causes the computer to further function as a character data reader. The character data reader reads character data from the predetermined external storage medium. The character data storager further stores the character data read by the character data reader.

According to the eighth embodiment, the character data is read from the predetermined external storage medium and stores the same, and thus, in such a case as well, it is possible to acquire a character independent of a communication.

In a ninth embodiment the character data includes at least a parts parameter as to parts making up of a corresponding character. Furthermore, the computer further includes a parts image storager which stores a parts image corresponding to the parts parameter. The character generator reads parts images corresponding to respective parts parameters included in the predetermined character data from the parts image storager, and generates the character by using the read parts images.

According to the ninth embodiment, the character data includes a parts parameter, and the parts images are stored in the computer, capable of saving an amount of character data to be transmitted and received. That is, it is possible to reduce a communication load.

In a tenth embodiment the character data includes at least a parts parameter as to parts making up of a corresponding character. Furthermore, the computer further includes a parts image storager which stores a parts image corresponding to the parts parameter. The character generator reads parts images corresponding to respective parts parameters included in the predetermined character data from the parts image storager, and generates the character by combining the read parts images. The character data storager also stores character data corresponding to the character generated by the character generator in the character memory area.

In the tenth embodiment as well, similar to the ninth embodiment, it is possible to reduce a communication load. Furthermore, the generated character is stored, and therefore, as to the character generated once, generation processing need not be executed from the next time onward. That is, it is possible to also reduce the load due to the generation.

In an eleventh embodiment the game program causes the computer to further function as a character creator. The character creator creates a character in response to an operation by a user. The character data storager further stores character data corresponding to the character created by the character creator in the character data memory area.

According to the eleventh embodiment, the user can create a character and thus has an enjoyment of creating the character.

In a twelfth embodiment the character creator creates the character by using parts prepared in advance.

According to the twelfth embodiment, a character is created by using the parts prepared in advance, and thus, it is possible to easily create a character.

In a thirteenth embodiment the game program causes the computer to further function as a character data transmitter. The character data transmitter transmits the character data created by the character creator by utilizing the communicator.

According to the thirteenth embodiment, it is possible to give the created character to others. Thus, by receiving a character created by others, it is possible to acquire a new character.

In a fourteenth embodiment the game program causes the computer to further function as a code data generator and a code data displayer. The code data generator generates the code data from the character data created by the character creator. The code data displayer displays the code data generated by the code data generator on the displayer.

According to the fourteenth embodiment, it is possible to give the created character to others independent of a communication. Furthermore, it is possible to acquire a character crated by others independent of a communication. Thus, it is possible to acquirer a new character.

In a fifteenth embodiment the character data storager which stores the character data in a character temporary memory area different from the character memory area when the character data is received by the character data receiver. That is, in a case that character data transmitted from an unspecified computer is received, the character data is not immediately stored in the character memory area by being stored in the character temporary memory area.

According to the fifteenth embodiment, it is possible to separately store the character data acquired from a specified computer and the character data acquired from an unspecified computer.

In a sixteenth embodiment the game program causes the computer to further function as a temporary character selector and a character data mover. The temporary character selector selects predetermined character data out of the character data stored in the character temporary memory area in response to an operation by a user. The character data mover moves the predetermined character data selected by the temporary character selector from the character temporary memory area to the character memory area. That is, the character data acquired from an unspecified computer is moved to the character memory area according to an operation by the user, for example. In addition, the character data that is not moved is erased, for example.

According to the sixteenth embodiment, the character data acquired from the unspecified computer is selectively stored in the character memory area, and therefore, only the character that the user considers as being necessary can be moved, and an unnecessary one can be erased.

In a seventeenth embodiment the temporary character selector includes a character temporary generator and a character temporary displayer. The character temporary generator generates a character corresponding to at least one character data stored in the character temporary memory area by the character data storager. The character temporary displayer displays the character generated by the character temporary generator on the displayer. Furthermore, the temporary character selector makes the user select the predetermined character from the characters displayed by the character temporary displayer.

According to the seventeenth embodiment, a character corresponding to the character data acquired from an unspecified computer is generated and displayed, and therefore, the user can determine whether or not the character is to be moved to the character memory area, viewing the character. That is, it is possible to easily determine whether or not the character is to be moved, or whether or not the character is to be erased.

In an eighteenth embodiment the game program causes the computer to further function as a state determiner and a copier. The state determiner determines whether or not the predetermined character data selected by the character selector is a transmittable state. For example, it is determined whether or not transmitting the acquired character data to another predetermined computer is prohibited. The copier copies the predetermined character data from the character memory area to a transmittable area when the state determiner determines that the predetermined character data is the transmittable state.

According to the eighteenth embodiment, only the transmittable character data can be set to a transmittable state.

In a nineteenth embodiment the game program causes the computer to further function as a character selector, a code data calculator, and an outputter. The character selector selects predetermined character data out of the character data stored in the character memory area in response to an operation by a user. The code data calculator calculates code data from the predetermined character data selected by the character selector. The outputter outputs at least code data calculated by the code data calculator to the displayer and the external storage medium connected to the computer, for example.

According to the nineteenth embodiment, the code data is output, and thus, it is possible to give the character data to another computer.

In a twentieth embodiment the outputter outputs image data corresponding to the code data. Accordingly, a predetermined image corresponding to the code data is displayed on the displayer of the game apparatus, for example.

According to the twentieth embodiment, by making the predetermined image displayed on the displayer image, it is possible to give the character data to another computer.

In a twenty-first embodiment the code data acquired by the code data acquirer is two-dimensional code data. For example, a predetermined image corresponding to the two-dimensional code data is a QR Code. The character data calculator calculates the character data from the two-dimensional code data acquired by the code data acquirer.

According to the twenty-first embodiment, the two-dimensional code data is used, and therefore, it is possible to make a predetermined image corresponding thereto relatively smaller. Accordingly, it is possible to print the image on a relatively small card as well as a magazine. Thus, the user who acquires the printed matter can acquire a new character.

A twenty-second embodiment is a game apparatus having a communicator, an imager and a displayer, comprising: a character data receiver which receives character data from a connectable predetermined computer via the communicator; a code data acquirer which acquires code data by imaging a predetermined image by the imager; a character data calculator which calculates character data from the code data acquired by the code data acquirer; a character generator which generates a character corresponding to the character data received by the character data receiver or the character data calculated by the character data calculator; and a game processor which executes game processing by displaying the character generated by the character generator on the displayer.

A twenty-third embodiment is a game controlling method of a game apparatus having a communicator, an imager and a displayer, following steps of: (a) receiving character data from a connectable predetermined computer via the communicator, (b) acquiring code data by imaging a predetermined image by the imager, (c) calculating character data from the code data acquired by the step (b), (d) generating a character corresponding to the character data received by the step (a) or the character data calculated by the step (c), and (e) executing game processing by displaying the character generated by the step (d) on the displayer.

A twenty-fourth embodiment is a game system having a game apparatus including a communicator, an imager and a displayer, and a predetermined computer which is connectable to the game apparatus, the game apparatus comprising: a character data receiver which receives character data from the predetermined computer via the communicator; a code data acquirer which acquires code data by imaging a predetermined image by the imager; a character data calculator which calculates character data from the code data acquired by the code data acquirer; a character generator which generates a character corresponding to the character data received by the character data receiver or the character data calculated by the character data calculator; and a game processor which executes game processing by displaying the character generated by the character generator on the displayer.

In the twenty-second embodiment to the twenty-fourth embodiment as well, similar to the first embodiment, it is possible to make more users acquire new characters.

The above described features, aspects and advantages of the present embodiments will become more apparent from the following detailed description of the present embodiments when taken in conjunction with the accompanying drawings.

BRIEF DESCRIPTION OF THE DRAWINGS

FIG. 4 is an illustrative view showing an example of character information corresponding to character information data;

DETAILED DESCRIPTION OF THE
PREFERRED EMBODIMENTS

Figure 1:
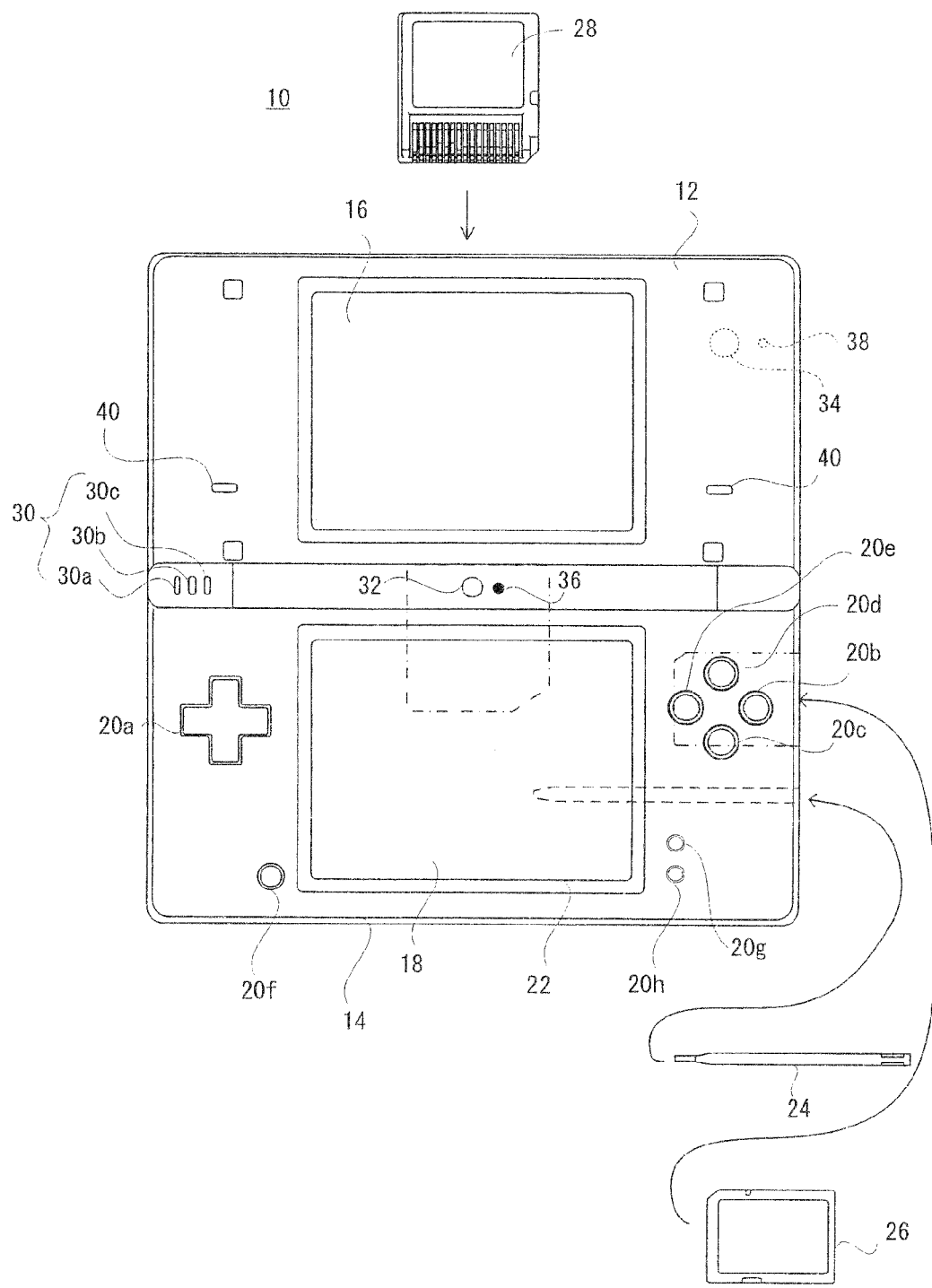
FIG. 1 is an illustrative view showing an external configuration of a game apparatus of an example embodiment.

Referring to FIG. 1, a game apparatus 10 of one embodiment includes an upper housing 12 and a lower housing 14, and the upper housing 12 and the lower housing 14 are connected with each other so as to be opened or closed (foldable). In FIG. 1 example, the upper housing 12 and the lower housing 14 are constructed in the form of a horizontally long rectangular plate, and are rotatably connected with each other at the long sides of both of the housings. That is, the game apparatus 10 of this embodiment is a folding hand-held game apparatus, and in FIG. 1, the game apparatus 10 is shown in an opened state (in an open state). The game apparatus 10 is constructed such a size that the user can hold with both hands or one hand even in the open state.

Generally, the user uses the game apparatus 10 in the open state. Furthermore, the user keeps the game apparatus 10 in a close state when not using the game apparatus 10. Here, the game apparatus 10 can maintain an opening and closing angle formed between the upper housing 12 and the lower housing 14 at an arbitrary angle between the close state and open state by a friction force, etc. exerted at the connected portion as well as the aforementioned close state and open state. That is, the upper housing 12 can be fixed with respect to the lower housing 14 at the arbitrary angle.

Additionally, the game apparatus 10 is mounted with a camera (32, 34) described later, functioning as an imaging device, such as imaging an image with the camera (32, 34), displaying the imaged image on the screen, and saving the imaged image data.

As shown in FIG. 1, the upper housing 12 is provided with a first LCD 16, and the lower housing 14 is provided with a second LCD 18. The first LCD 16 and the second LCD 18 take a horizontally-long shape, and are arranged such that the directions of the long sides thereof are coincident with the long sides of the upper housing 12 and the lower housing 14. For example, resolutions of the first LCD 16 and the second LCD 18 are set to 256 (horizontal)×192 (vertical) pixels (dots).

In addition, although an LCD is utilized as a display in this embodiment, an EL (Electronic Luminescence) display, a plasmatic display, etc. may be used in place of the LCD. Furthermore, the game apparatus 10 can utilize a display with an arbitrary resolution.

Figure 2:
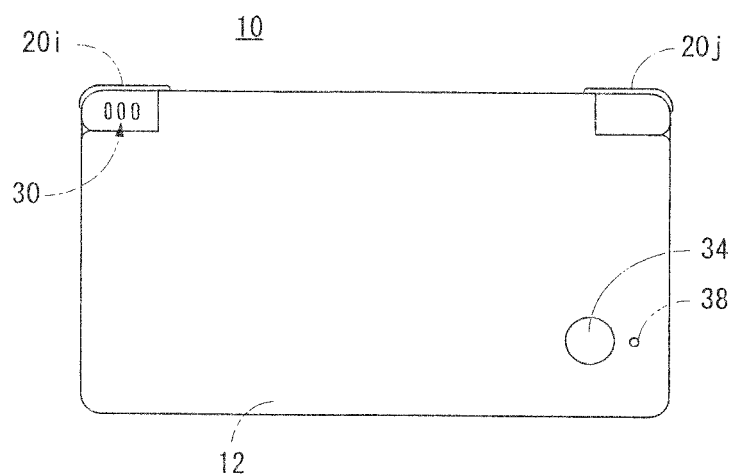
FIG. 2 is an illustrative view showing a top and a left side surface of the game apparatus in a folded state shown in FIG. 1.
Figure 2:
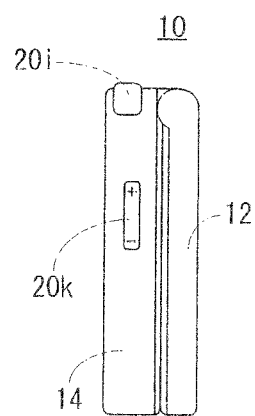

As shown in FIG. 1 and FIG. 2, the lower housing 14 is provided with respective operation buttons 20a-20k as input devices. Out of the respective operation buttons 20a-20k, the direction input button 20a, the operation button 20b, the operation button 20c, the operation button 20d, the operation button 20e, the power button 20f, the start button 20g, and the select button 20h are provided on the surface (inward surface) to which the second LCD 18 of the lower housing 14 is set. More specifically, the direction input button 20a and the power button 20f are arranged at the left of the second LCD 18, and the operation buttons 20b-20e, 20g and 20h are arranged at the right of the second LCD 18. Furthermore, when the upper housing 12 and the lower housing 14 are folded, the operation buttons 20a-20h are enclosed within the game apparatus 10.

The direction input button (cross key) 20a functions as a digital joystick, and is used for instructing a moving direction of a player object, moving a cursor, and so forth. Each operation buttons 20b-20e is a push button, and is used for causing the player object to make an arbitrary action, executing a decision and cancellation, and so forth. The power button 20f is a push button, and is used for turning on or off the main power supply of the game apparatus 10. The start button 20g is a push button, and is used for temporarily stopping (pausing), starting (restarting) a game, and so forth. The select button 20h is a push button, and is used for a game mode selection, a menu selection, etc.

Although operation buttons 20i-20k are omitted in FIG. 1, as shown in FIG. 2 (A), the operation button (L button) 20i is provided at the left corner of the upper side surface of the lower housing 14, and the operation button (R button) 20j is provided at the right corner of the upper side surface of the lower housing 14. Furthermore, as shown in FIG. 2 (B), the volume button 20k is provided on the left side surface of the lower housing 14.

FIG. 2 (A) is an illustrative view of the game apparatus 10 in a folded manner as seen from a top surface (upper housing 12). FIG. 2 (B) is an illustrative view of the game apparatus 10 in a folded manner when seen from a left side surface.

The L button 20i and the R button 20j are push buttons, and can be used for similar operations to those of the operation buttons 20b-20e, and can be used as subsidiary operations of these operation buttons 20b-20e. Furthermore, in this embodiment, the L button 20i and the R button 20j can be also used for an operation of an imaging instruction (shutter operation). The volume button 20k is made up of two push buttons, and is utilized for adjusting the volume of the sound output from two speakers (right speaker and left speaker) not shown. In this embodiment, the volume button 20k is provided with an operating portion including two push portions, and the aforementioned push buttons are provided by being brought into correspondence with the respective push portions. Thus, when the one push portion is pushed, the volume is made high, and when the other push portion is pushed, the volume is made low. For example, when the push portion is hold down, the volume is gradually made high, or the volume is gradually made low.

Returning to FIG. 1, the game apparatus 10 is further provided with a touch panel 22 as an input device separate from the operation buttons 20a-20k. The touch panel 22 is attached so as to cover the screen of the second LCD 18. In this embodiment, a touch panel of a resistance film system is used as the touch panel 22, for example. However, the touch panel 22 can employ an arbitrary push-type touch panel without being restricted to the resistance film system. Furthermore, in this embodiment, as the touch panel 22, a touch panel having the same resolution (detection accuracy) as the resolution of the second LCD 18, for example, is utilized. However, the resolution of the touch panel 22 and the resolution of the second LCD 18 are not necessarily coincident with each other.

Additionally, at the right side surface of the lower housing 14, a loading slot (represented by a dashed line shown in FIG. 1) is provided. The loading slot can house a touch pen 24 to be utilized for performing an operation on the touch panel 22. Generally, an input with respect to the touch panel 22 is performed with the touch pen 24, but it may be performed with a finger of the user beyond the touch pen 24. Accordingly, in a case that the touch pen 24 is not to be utilized, the loading slot and the housing portion for the touch pen 24 need not be provided.

Moreover, on the right side surface of the lower housing 14, a loading slot for housing a memory card 26 (represented by a chain double-dashed line in FIG. 1) is provided. Inside of the loading slot, a connector (not illustrated) for electrically connecting the game apparatus 10 and the memory card 26 is provided. The memory card 26 is an SD card, for example, and detachably attached to the connector. This memory card 26 is used for storing (saving) an image imaged by the game apparatus 10, and reading the image generated (imaged) or stored by another apparatus in the game apparatus 10.

In addition, on the upper side surface of the lower housing 14, a loading slot (represented by an alternate long and short dash line FIG. 1) for housing a memory card 28 is provided. Inside the loading slot as well, a connector (not illustrated) for electrically connecting the game apparatus 10 and the memory card 28 is provided. The memory card 28 is a recording medium of recording an information processing program, necessary data, etc. and is detachably attached to the loading slot provided to the lower housing 14.

At the left end of the connected portion (hinge) between the upper housing 12 and the lower housing 14, an indicator 30 is provided. The indicator 30 is made up of three LEDs 30a, 30b, 30c. Here, the game apparatus 10 can make a wireless communication with another appliance, and the first LED 30a lights up when a wireless communication with the appliance is established. The second LED 30b lights up while the game apparatus 10 is recharged. The third LED 30c lights up when the main power supply of the game apparatus 10 is turned on. Thus, by the indicator 30 (LEDs 30a-30c), it is possible to inform the user of a communication-established state, a charge state, and a main power supply on/off state of the game apparatus 10.

Although illustration is omitted, a switch (opening and closing switch 42: see FIG. 3) that is switched in response to opening and closing of the game apparatus 10 is provided inside the hinge. For example, the opening and closing switch 42 is turned on when that the game apparatus 10 is in an opened state. On the other hand, the opening and closing switch 42 is turned off when that the game apparatus 10 is in a closed (folded) state. Here, it is only necessary to find that the game apparatus 10 is in the opened state or the closed state, and therefore, the turning on and off of the opening and closing switch 42 may be reversed.

As described above, the upper housing 12 is provided with the first LCD 16. In this embodiment, the touch panel 22 is set so as to cover the second LCD 18, but the touch panel 22 may be set so as to cover the first LCD 16. Alternatively, two touch panels 22 may be set so as to cover the first LCD 16 and the second LCD 18. For example, on the second LCD 18, an operation explanatory screen for teaching the user how the respective operation buttons 20a-20k and the touch panel 22 work or how to operate them, and a game screen are displayed.

Additionally, the upper housing 12 is provided with the two cameras (inward camera 32 and outward camera 34). As shown in FIG. 1, the inward camera 32 is attached in the vicinity of the connected portion between the upper housing 12 and the lower housing 14 and on the surface to which the first LCD 16 is provided such that the display surface of the first LCD 16 and the imaging surface are in parallel with each other or are leveled off. On the other hand, the outward camera 34 is attached to the surface being opposed to the surface to which the inward camera 32 is provided as shown in FIG. 2 (A), that is, on the outer surface of the upper housing 12 (the surface turns to the outside when the game apparatus 10 is in a close state, and on the back surface of the upper housing 12 shown in FIG. 1). Here, in FIG. 1, the outward camera 34 is shown by a dashed line.

Accordingly, the inward camera 32 can image a direction to which the inner surface of the upper housing 12 is turned, and the outward camera 34 can image a direction opposite to the imaging direction of the inward camera 32, that is, can image a direction to which the outer surface of the upper housing 12 is turned. Thus, in this embodiment, the two cameras 32, 34 are provided such that the imaging directions of the inward camera 32 and the outward camera 34 are opposite with each other. For example, the user holding the game apparatus 10 can image a landscape (including the user, for example) as the user is seen from the game apparatus 10 with the inward camera 32, and can image a landscape as the direction opposite to the user is seen from the game apparatus 10 with the outward camera 34.

Additionally, on the internal surface near the aforementioned connected portion, a microphone 84 (see FIG. 3) is housed as a voice input device. Then, on the internal surface near the aforementioned connected portion, a through hole 36 for the microphone 84 is formed so as to detect a sound outside the game apparatus 10. The position for housing the microphone 84 and the position of the through hole 36 for the microphone 84 are not necessarily on the aforementioned connected portion, and the microphone 84 may be housed in the lower housing 14, and the through hole 36 for the microphone 84 may be provided to the lower housing 14 in correspondence with the housing position of the microphone 84.

Furthermore, on the outer surface of the upper housing 12, in the vicinity of the outward camera 34, a fourth LED 38 (dashed line in FIG. 1) is attached. The fourth LED 38 lights up at a time when an imaging is made with the inward camera 32 or the outward camera 34 (shutter button is pushed). Furthermore, in a case that a motion image is imaged with the inward camera 32 or the outward camera 34, the fourth LED 38 continues to light up during the imaging. That is, by making the fourth LED 38 light up, it is possible to inform an object to be imaged or his or her surrounding that an imaging with the game apparatus 10 is made (is being made).

Moreover, the upper housing 12 is formed with a sound release hole 40 on both sides of the first LCD 16. The above-described speaker is housed at a position corresponding to the sound release hole 40 inside the upper housing 12. The sound release hole 40 is a through hole for releasing the sound from the speaker to the outside of the game apparatus 10.

As described above, the upper housing 12 is provided with the inward camera 32 and the outward camera 34 which are constituted to image an image, and the first LCD 16 as a displayer for mainly displaying the imaged image and a game screen. On the other hand, the lower housing 14 is provided with the input device (operation button 20 (20a-20k) and the touch panel 22) for performing an operation input to the game apparatus 10 and the second LCD 18 as a displayer for mainly displaying an operation explanatory screen and a game screen. Accordingly, the game apparatus 10 has two screens (16, 18) and two kinds of operating portions (20, 22).

Figure 3:
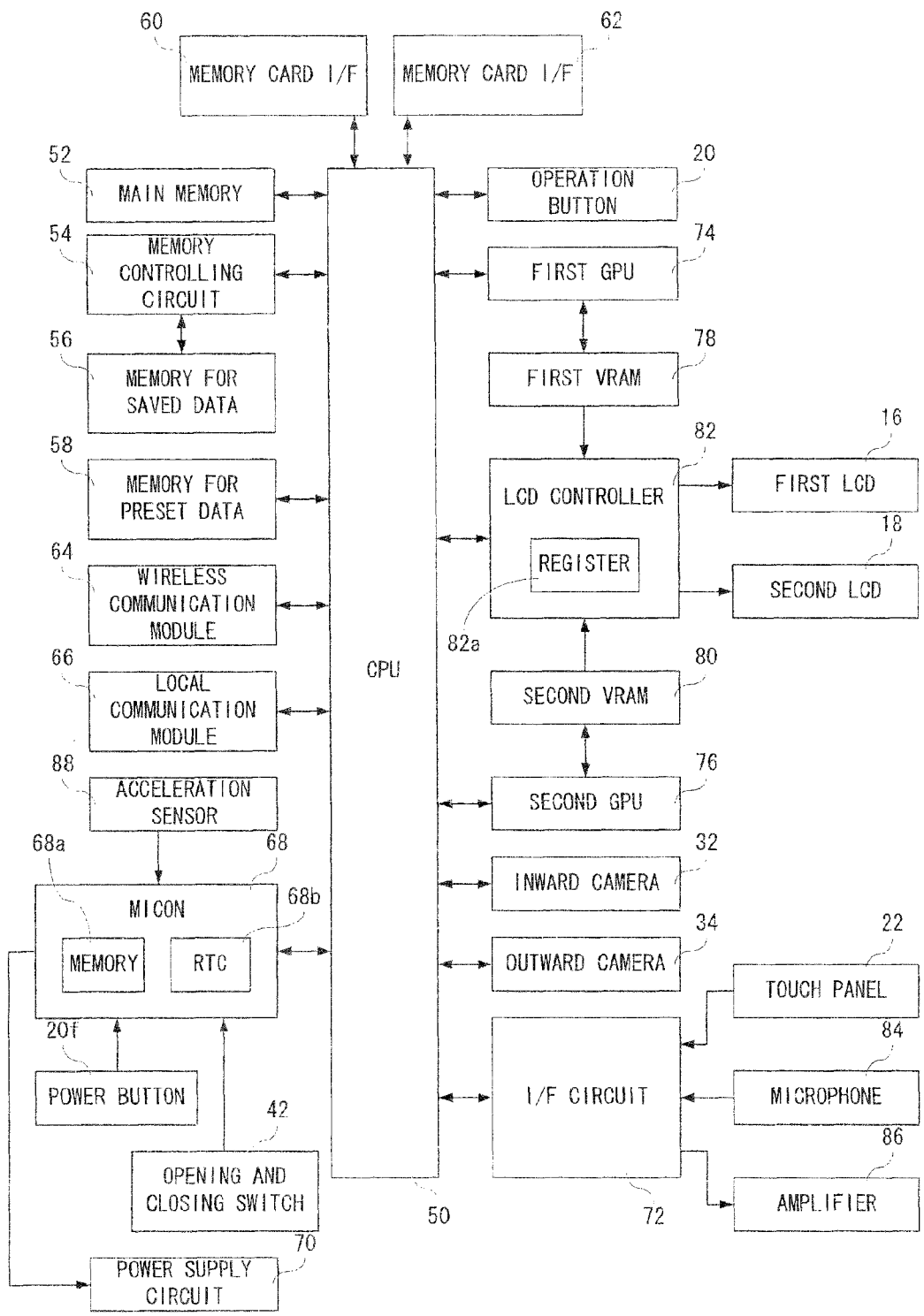
FIG. 3 is a block diagram showing an electric configuration of the game apparatus shown in FIG. 1 and FIG. 2.

FIG. 3 is a block diagram showing an electric configuration of the game apparatus 10 of this embodiment. As shown in FIG. 3, the game apparatus 10 includes electronic components, such as a CPU 50, a main memory 52, a memory controlling circuit 54, a memory for saved data 56, a memory for preset data 58, a memory card interface (memory card I/F) 60, a memory card I/F 62, a wireless communication module 64, a local communication module 66, a micon 68, a power supply circuit 70, an interface circuit (I/F circuit) 72, a first GPU (Graphics Processing Unit) 74, a second GPU 76, a first VRAM (Video RAM) 78, a second VRAM 80, an LCD controller 82, etc. These electronic components (circuit components) are mounted on an electronic circuit board, and housed in the lower housing 14 (or the upper housing 12 may also be appropriate).

The CPU 50 is an information processing means for executing a predetermined program. In this embodiment, the predetermined program is stored in a memory (memory for saved data 56, for example) within the game apparatus 10 and the memory card 26 and/or 28, and the CPU 50 executes information processing described later by executing the predetermined program.

Here, the program to be executed by the CPU 50 may be previously stored in the memory within the game apparatus 10, acquired from the memory card 26 and/or 28, and acquired from another appliance by communicating with this another appliance.

The CPU 50 is connected with the main memory 52, the memory controlling circuit 54, and the memory for preset data 58. The memory controlling circuit 54 is connected with the memory for saved data 56. The main memory 52 is a memory means to be utilized as a work area and a buffer area of the CPU 50. That is, the main memory 52 stores (temporarily stores) various data to be utilized in the aforementioned information processing, and stores a program from the outside (memory cards 26 and 28, and another appliance). In this embodiment, as a main memory 52, a PSRAM (Pseudo-SRAM) is used, for example. The memory for saved data 56 is a memory means for storing (saving) a program to be executed by the CPU 50, data of an image imaged by the inward camera 32 and the outward camera 34, etc. The memory for saved data 56 is constructed by a nonvolatile storage medium, and can utilize a NAND type flash memory, for example. The memory controlling circuit 54 controls reading and writing from and to the memory for saved data 56 according to an instruction from the CPU 50. The memory for preset data 58 is a memory means for storing data (preset data), such as various parameters, etc. which are previously set in the game apparatus 10. As a memory for preset data 58, a flash memory to be connected to the CPU 50 through an SPI (Serial Peripheral Interface) bus can be used.

Both of the memory card I/Fs 60 and 62 are connected to the CPU 50. The memory card I/F 60 performs reading and writing data from and to the memory card 26 attached to the connector according to an instruction form the CPU 50. Furthermore, the memory card I/F 62 performs reading and writing data from and to the memory card 28 attached to the connector according to an instruction form the CPU 50. In this embodiment, image data corresponding to the image imaged by the inward camera 32 and the outward camera 34 and image data received by other devices are written to the memory card 26, and the image data stored in the memory card 26 is read from the memory card 26 and stored in the memory for saved data 56, and sent to other devices. Furthermore, the various programs stored in the memory card 28 is read by the CPU 50 so as to be executed.

Here, the information processing program such as a game program is not only supplied to the game apparatus 10 through the external storage medium, such as a memory card 28, etc. but also is supplied to the game apparatus 10 through a wired or a wireless communication line. In addition, the information processing program may be recorded in advance in a nonvolatile storage device inside the game apparatus 10. Additionally, as an information storage medium for storing the information processing program, an optical disk storage medium, such as a CD-ROM, a DVD or the like may be appropriate beyond the aforementioned nonvolatile storage device.

The wireless communication module 64 has a function of connecting to a wireless LAN according to an IEEE802.11.b/g standard-based system, for example. The local communication module 66 has a function of performing a wireless communication with the same types of the game apparatuses by a predetermined communication system. The wireless communication module 64 and the local communication module 66 are connected to the CPU 50. The CPU 50 can receive and send data over the Internet with other appliances by means of the wireless communication module 64, and can receive and send data with the same types of other game apparatuses by means of the local communication module 66.

Furthermore, the CPU 50 is connected with the micon 68. The micon 68 includes a memory 68a and an RTC 68b. The memory 68a is a RAM, for example, and stores a program and data for a control by the micon 68. The RTC 68b counts a time. In the micon 68, date and a current time, etc. can be calculated on the basis of the time counted by the RTC 68b.

The micon 68 is connected with the power button 20f, the opening and closing switch 42, the power supply circuit 70, and the acceleration sensor 88. A power-on signal is given to the micon 68 from the power button 20f. When the power button 20f is turned on in a state that the main power supply of the game apparatus 10 is turned off, the memory 68a functioning as a BootROM of the micon 68 is activated to perform a power control in response to opening and closing of the game apparatus 10 as described above. On the other hand, when the power button 20f is turned on in a state that the main power supply of the game apparatus 10 is turned on, the micon 68 instructs the power supply circuit 70 to stop supplying power to all the circuit components (except for the micon 68). Here, the power supply circuit 70 controls the power supplied from the power supply (typically, a battery housed in the lower housing 14) of the game apparatus 10 to supply power to the respective circuit components of the game apparatus 10.

Furthermore, from an opening and closing switch 42, a power-on signal or a power-off signal is applied to the micon 68. In a case that the main power supply of the game apparatus 10 is turned on in a state that the opening and closing switch 42 is turned on (the main body of the game apparatus 10 is in an opened state), a mode in which a power is supplied from the power supply circuit 70 to all the circuit components of the game apparatus 10 under the control of the micon 68 (hereinafter referred to as "normal mode") is set. In the normal mode, the game apparatus 10 can execute an arbitrary application, and a user or a player (hereinafter referred to as "player") is in use (using state).

Furthermore, in a case that the opening and closing switch 42 is turned off in a state that the power supply of the game apparatus 10 is turned on (the main body of the game apparatus 10 is in a closed state), a mode in which a power is supplied from the power supply circuit 70 to a part of the components of the game apparatus 10 (hereinafter referred to as "sleep mode") is set. In the sleep mode, the game apparatus 10 cannot execute an arbitrary application, and is a state that the player is not in use (non using state). In this embodiment, the part of the components is the CPU 50, the wireless communication module 64, and the micon 68. Here, in the sleep mode (sleep state), the CPU 50 is basically in a state that a clock is stopped (inactivated), resulting in less power consumption. Additionally, in the sleep mode, a power supply to the CPU 50 may be stopped. Accordingly, as described above, in this embodiment, in the sleep mode, an application is never executed by the CPU 50.

It should be noted that in a case that a communication is executed by the wireless communication module 64 in the sleep state, the CPU 50 is activated by a control signal from the wireless communication module 64. That is, by the wireless communication module 64, the clock of the CPU 50 is operated, and then, the wireless communication module 64 instructs the CPU 50 to start a communication. This holds true hereunder. Then, the CPU 50 instructs the micon 68 to start supplying power to the memory controlling circuit 54 and the memory for saved data 56. Accordingly, it is possible to transmit data stored in the memory for saved data 56 to another game apparatus 10, etc. by a communication, and store data received from another game apparatus 10, etc. in the memory for saved data 56.

Furthermore, in a case that step count data is output from the micon 68 in the sleep state, the CPU 50 is activated in response to a control signal from the micon 68. That is, by the micon 68, the clock of the CPU 50 is activated to notify the output of the step count data. Furthermore, the micon 68 controls the power supply circuit 70 to start supplying power to the memory controlling circuit 54 and the memory for saved data 56. Accordingly, the step data output from the micon 68 is stored in the memory for saved data 56.

In addition, when the sleep state is canceled (non-sleep state) due to the game apparatus 10 being opened, and so forth, a power-off signal is input to the micon 68 from the opening and closing switch 42. Thus, the micon 68 activates the CPU 50 to notify the CPU 50 of the cancelation of the sleep state. In response thereto, the CPU 50 instructs the micon 68 to cancel the sleep state. That is, under the instruction from the CPU 50, the micon 68 controls the power supply circuit 70 to start supplying power to all the circuit components. Thus, the game apparatus 10 makes a transition to the normal mode to become the using state.

Moreover, as described above, the micon 68 is connected with the acceleration sensor 88. For example, the acceleration sensor 88 is a three-axis acceleration sensor, and provided inside the lower housing 14 (the upper housing 12 may be possible). This detects an acceleration in a direction vertical to the surface of the first LCD 16 (second LCD 18) of the game apparatus 10, and accelerations in two crosswise directions (longitudinal and laterally) that are parallel to the first LCD 16 (second LCD 18). The acceleration sensor 88 outputs a signal as to the detected acceleration (acceleration signal) to the micon 68. The micon 68 can detect a direction of the game apparatus 10, and a magnitude of the shake of the game apparatus 10 on the basis of the acceleration signal. Accordingly, it is possible to make the micon 68 and the acceleration sensor 88 function as a pedometer, for example. The pedometer using the acceleration sensor 88 is already known, and therefore, the detailed content is omitted, but the step counts are measured in correspondence with the magnitude of the acceleration.

Also, the game apparatus 10 includes the microphone 84 and an amplifier 86. Both of the microphone 84 and the amplifier 86 are connected to the I/F circuit 72. The microphone 84 detects a voice and a sound (clap and handclap, etc.) of the user produced or generated toward the game apparatus 10, and outputs a sound signal indicating the voice or the sound to the I/F circuit 72. The amplifier 86 amplifies the sound signal applied from the I/F circuit 72, and applies the amplified signal to the speaker (not illustrated). The I/F circuit 72 is connected to the CPU 50.

The touch panel 22 is connected to the I/F circuit 72. The I/F circuit 72 includes a sound controlling circuit for controlling the microphone 84 and the amplifier 86 (speaker), and a touch panel controlling circuit for controlling the touch panel 22. The sound controlling circuit performs an A/D conversion and a D/A conversion on a sound signal, or converts a sound signal into sound data in a predetermined format. The touch panel controlling circuit generates touch position data in a predetermined format on the basis of a signal from the touch panel 22 and outputs the same to the CPU 50. For example, the touch position data is data indicating coordinates of a position where an input is performed on an input surface of the touch panel 22.

Additionally, the touch panel controlling circuit performs reading of a signal from the touch panel 22 and generation of the touch position data per each predetermined time. By fetching the touch position data via the I/F circuit 72, the CPU 50 can know the position on the touch panel 22 where an input is made.

The operation button 20 is made up of the aforementioned respective operation buttons 20a-20k (except for the power switch 22f. This hold true for the following), and is connected to the CPU 50. The operation data indicating an input state (whether or not to be pushed) with respect to each of the operation buttons 20a-20k is output from the operation button 20 to the CPU 50. The CPU 50 acquires the operation data from the operation button 20, and executes processing according to the acquired operation data.

Both of the inward camera 32 and the outward camera 34 are connected to the CPU 50. The inward camera 32 and the outward camera 34 image images according to instructions from the CPU 50, and output image data corresponding to the imaged images to the CPU 50. In this embodiment, the CPU 50 issues an imaging instruction to any one of the inward camera 32 and the outward camera 34 while the camera (32, 34) which has received the imaging instruction images an image and transmits the image data to the CPU 50.

The first GPU 74 is connected with the first VRAM 78, and the second GPU 76 is connected with the second VRAM 80. The first GPU 74 generates a first display image on the basis of data for generating the display image stored in the main memory 52 according to an instruction from the CPU 50, and draws the same in the first VRAM 78. The second GPU 76 similarly generates a second display image according to an instruction form the CPU 50, and draws the same in the second VRAM 80. The first VRAM 78 and the second VRAM 80 are connected to the LCD controller 82.

The LCD controller 82 includes a register 82a. The register 82a stores a value of "0" or "1" according to an instruction from the CPU 50. In a case that the value of the register 82a is "0", the LCD controller 82 outputs the first display image drawn in the first VRAM 78 to the second LCD 18, and outputs the second display image drawn in the second VRAM 80 to the first LCD 16. Furthermore, in a case that the value of the register 82a is "1", the LCD controller 82 outputs the first display image drawn in the first VRAM 78 to the first LCD 16, and outputs the second display image drawn in the second VRAM 80 to the second LCD 18.

For example, such a game apparatus 10 executes in-passing communication processing when being set to a sleep mode. Here, the in-passing communication processing is briefly explained. In the sleep mode, the wireless communication module 64 transmits (broadcasts) a signal (connection request signal) indicating a connection request to another game apparatus 10, and tries to receive a connection request signal from another game apparatus 10 each predetermined time (30 ms, for example). That is, communication processing is intermittently executed. Thus, another game apparatus 10 being a communication partner is searched (scanned). Here, the connection request signal includes identifying information of the game apparatus 10 being a transmission source.

At this time, when receiving the connection request signal, the game apparatus 10 transmits a connection permission signal to the game apparatus 10 being a transmission source of the connection request signal in response thereto. Here, the connection permission signal includes identifying information of the game apparatus 10 being a transmission source. This makes it possible to confirm each other's existences between the two game apparatuses 10 to thereby establish a communication state between them.

Here, in the game apparatus 10 that transmits the connection permission signal in response to the connection request signal, the wireless communication module 64 activates the CPU 50 to start supplying power from the power supply circuit 70 to the memory controlling circuit 54 and the memory for saved data 56 under the control of the micon 68 according to an instruction from the CPU 50. Similarly, in the game apparatus 10 which receives the connection permission signal, the wireless communication module 64 activates the CPU 50 to start supplying power from the power supply circuit 70 to the memory controlling circuit 54 and the memory for saved data 56 under the control of the micon 68 according to an instruction from the CPU 50.

When a communication state is established, data set (decided) in advance, such as game data, message data, etc. is transmitted or received, or transmitted and received between the two game apparatuses 10.

Although the detailed illustration is omitted, when the in-passing communication is ended, each game apparatus 10 returns to the sleep state.

Accordingly, when the player walks with the game apparatus 10 in the sleep state, a communication (in-passing communication) with another game apparatus 10 is executed without any operation to thereby acquire data, such as game data, message data from this another game apparatus 10.

Here, a case that the in-passing communication processing with another game apparatus 10 is executed is explained, but the in-passing communication processing may be executed with a predetermined access point. In such a case, game data, message data, etc. that are transmitted from the access point can be acquired.

Although the detailed explanation is omitted, in a case that in-passing communication is executed, out of the two game apparatuses 10 that establish the connection state, the game apparatus 10 that transmits a connection request signal functions as a parent machine, and the game apparatus 10 that transmits a connection permission signal in response to the connection request signal functions as a child machine.

Furthermore, in the sleep mode, the game apparatus 10 functions as a pedometer, and in a case that the player walks with the game apparatus 10 as described above, the step count of the player is counted. The counted step count is reflected on the processing of the information processing program, such as a game program to be executed by the game apparatus 10 as necessary.

In the game apparatus 10 with such a configuration, previously stored is a program (application program) of a portrait game of creating a character, exchanging a character with another game apparatus 10, receiving a character from an access point, acquiring a character based on the imaged image by the cameras 32, 34, generating and outputting data being an original of the character (character information data described later).

The character is a character imitating a human, for example. A character creating case is briefly explained. First, the player decides a gender of the character to be created. Then, the player sets its face and body shape. The setting of the face is on parts basis. For example, a plurality of kinds of images (parts images) are prepared for each of the parts as to a shape of the face, eyes, a nose, a mouth, a beard, a mole, a hairstyle, and the player selects a desired part. The parts images can be changed in position, size (length, width, etc.), shape, and color according to an operation by the player. Here, a position at which each of the parts (parts images) is arranged first is decided in advance. Furthermore, the character can wear glasses (sunglasses). The glasses are dealt similar to the aforementioned parts, and can be changed in position and color. After the face is set, the body shape is set. More specifically, the height and the width of the body are set. They have a maximum value and a minimum value that are previously decided, and can be set therebetween.

When the face and the body shape are set, a profile of the character to be created is set. More specifically, a name of the character (character name), a nickname, a birthday, a blood type, a favorite color, and a name of a creator are set. Here, the favorite color is reflected on a color of a jacket of the character.

Furthermore, when the profile of the character to be created is set, additional information (additive information) in association with the character to be created is set. More specifically, the additive information is information about whether or not the character that is being created is registered as a favorite one, an ID of the creator (the identifying information of the game apparatus 10), a version of the character, a copy allowable flag and a transmission allowable flag, etc.

Although not illustrated, a screen for selecting (deciding) a gender, parts of the face, a body shape, and a profile is displayed on the second LCD 18, and they are selected according to an operation by the player.

When a character is created, data (character information data) of the information of the character (character information shown in FIG. 4) is stored in a character permanent registration memory area 5640 (see FIG. 8) of the memory for saved data 56. It should be noted that the data (character image data) of the image of the created (drawn) character (character image) is stored in the main memory 52 (see FIG. 7).

As shown in FIG. 4, the character information corresponding to the character information data includes a gender, a birthday, a favorite color, a favorite flag, a character name (nickname), a body height and a body shape, a character ID, each parts and the associated information, a creator name, a creator ID, a version of the character, a copy allowable flag, a transmission allowable flag, a NG word check result flag and a region of a using font.

The gender is a gender set to the character. The birthday is a birthday set to the character. The favorite color is a favorite color of the player, and the color is set to the color of the clothes of the character. The favorite flag is a flag for determining whether or not a possessor or a creator of the character is in favor of this character, and set by the possessor or the creator. The character name (nickname) is a name given to the character. The body height and body shape are a body height and a body shape set to the character. The character ID is unique identification information applied to the character, and automatically applied by the game apparatus 10 (CPU 50) when this character is created. Each parts and the associated information are identification information of each of the parts of the character, that is, identification information (identification information of the image) of a shape of the face, eyes, nose, mouth, beard, mole, hair style and glasses and the associated information of each of the parts. Here, the associated information is information about a size, an arranging position, an inclination, and a change in ratio as to each of the parts.

The creator name is a name of the player who creates the character. The creator ID is identification information as to the creator, and automatically applied by the game apparatus 10 (CPU 50) when a character is created. In this embodiment, an MAC address as to the game apparatus 10 is applied as a creator ID. The version of the character is information of managing a version for determining whether the character is original or changed several times.

The copy allowable flag is a flag for determining, in the game apparatus 10 which receives a character, whether or not the copy of the character may be created. The transmission allowable flag is a flag for determining whether or not the character may be automatically transmitted to another game apparatus 10. It should be noted that in this embodiment, in a case that the transmission allowable flag indicates to be non-transmittable, a state that another game apparatus 10 is made acquirable is prohibited as well as a transmission of the character by a communication is prohibited. Accordingly, in a case of being non-transmittable, it is impossible to display a QR Code obtained by converting the encrypted character information data on the screen and output image data (code image data) of the QR Code to the memory card 26, 28 as described later. The copy allowable flag and the transmission allowable flag are set (turned on or off) according to an instruction from the creator of the character.

The NG word check result flag is a flag for determining whether or not a NG word is included in the character name and the creator name. Although the detailed explanation is omitted, the NG word is stored in advance in the memory for saved data 56 of the game apparatus 10 and the memory cards 26, 28. Accordingly, in a case that the character name or the creator name matches the NG word or includes the NG word, the NG word check result flag is turned on. On the other hand, in a case that the character name or the creator name does not match the NG word or does not include the NG word, the NG word check result flag is turned off. In a case that the NG word check result flag is turned on, a transmission of the character information data (including an encrypted case) as to this character to another game apparatus 10 is made impossible, or the character name and the creator name are un-displayed or changed to other representations (representation set except for the NG word in advance).

The region of the using font is information for identifying what region of the font the application program (the program of the portrait game in this embodiment) of displaying a character, etc. uses. For example, if the region is "0", fonts as to respective languages in Japan, U.S. and Europe are useable. Alternatively, if the region is "1", a Chinese font is useable. Still alternatively, if the region is "2", a Korean font is useable. Further alternatively, if the region is "3", a Formosan font is useable.

Furthermore, by transmitting and receiving characters with another game apparatus 10, the game apparatus 10 exchanges the characters. Thus, the game apparatus 10 acquires a new character from another game apparatus 10. Here, as a method of exchanging the characters, there are a method (1) of selecting a character to be transmitted and exchanging the characters with a specified another player (game apparatus 10) according to an operation by the player and a method (2) of only selecting a character to be transmitted according to an operation by the player, and exchanging the characters with another unspecified player (game apparatus 10) independent of an operation by the player. Which method is to be executed, the method (1) or the method (2) is decided by displaying a menu screen not illustrated according to an operation by the player and making a selection on the menu screen.

When the method (1) is selected, that is, when an exchange of characters is instructed in the game apparatus 10, communication processing is started to establish a communication state with another game apparatus 10 with which characters are exchanged. Although the detailed explanation is omitted, processing of searching the game apparatus 10 being a communication partner is similar to that of the above-described in-passing communication processing. Here, in this case, a player of the game apparatus 10 as a communication partner exists near its own game apparatus, and therefore, the player is specified.

Figure 5:
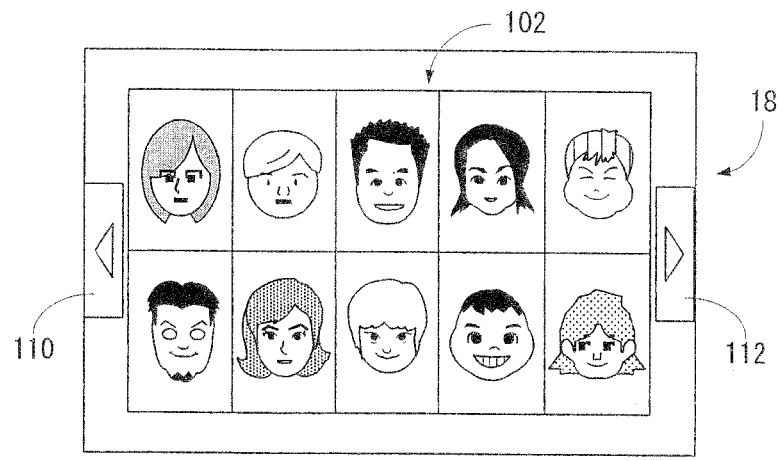
FIG. 5 is an illustrative view showing an example of a screen to be displayed on a second LCD of the game apparatus shown in FIG. 1 to FIG. 3.
Figure 5:
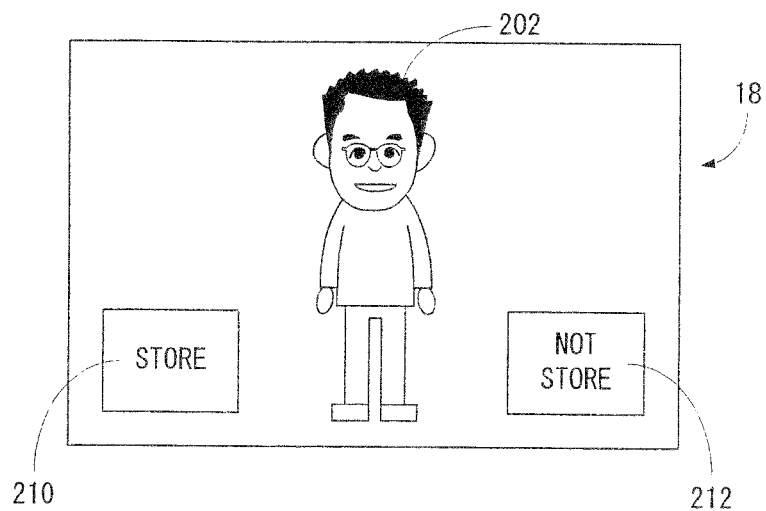

When the game apparatus 10 establishes a communication state with the other game apparatus 10, the player selects a character to be transmitted to the other game apparatus 10 (player). At this time, a character selecting screen 100 shown in FIG. 5(A) is displayed on the second LCD 18. On the character selecting screen 100 shown in FIG. 5(A), all the characters 102, 102, 102, . . . possessed by the player are displayed. Here, the characters possessed by the player means characters corresponding to each of all the character information data stored in the memory for saved data 56 of the game apparatus 10. Accordingly, the characters possessed by the player include characters that are permanently registered and characters that are not permanently registered as described later.

It should be noted that on the character selecting screen 100, only the facial images of the characters are displayed. Here, each of the facial images is included in character information indicated by character information data, and generated based on each of the parts and the associated information. That is, on the basis of each of the parts and the associated information, each of the parts image is selected, the size (shape), the arrangement position, the inclination and the change in ratio of each of the parts are decided, and data as to the facial image of the character is generated. This holds true for a case that a facial image of a character is generated hereafter.

Here, in a case that only the characters that are permanently registered are made transmittable, only the characters that are permanently registered are displayed on the character selecting screen 100.

Additionally, in FIG. 5(A), a button image 110 and a button image 112 are provided. Accordingly, if the player possesses a number of characters, and the facial images of all the characters cannot be displayed at a time, by turning on the button image 110 or the button image 112, the screen is scrolled from right and left to thereby display the facial images of other characters.

Figure 7:
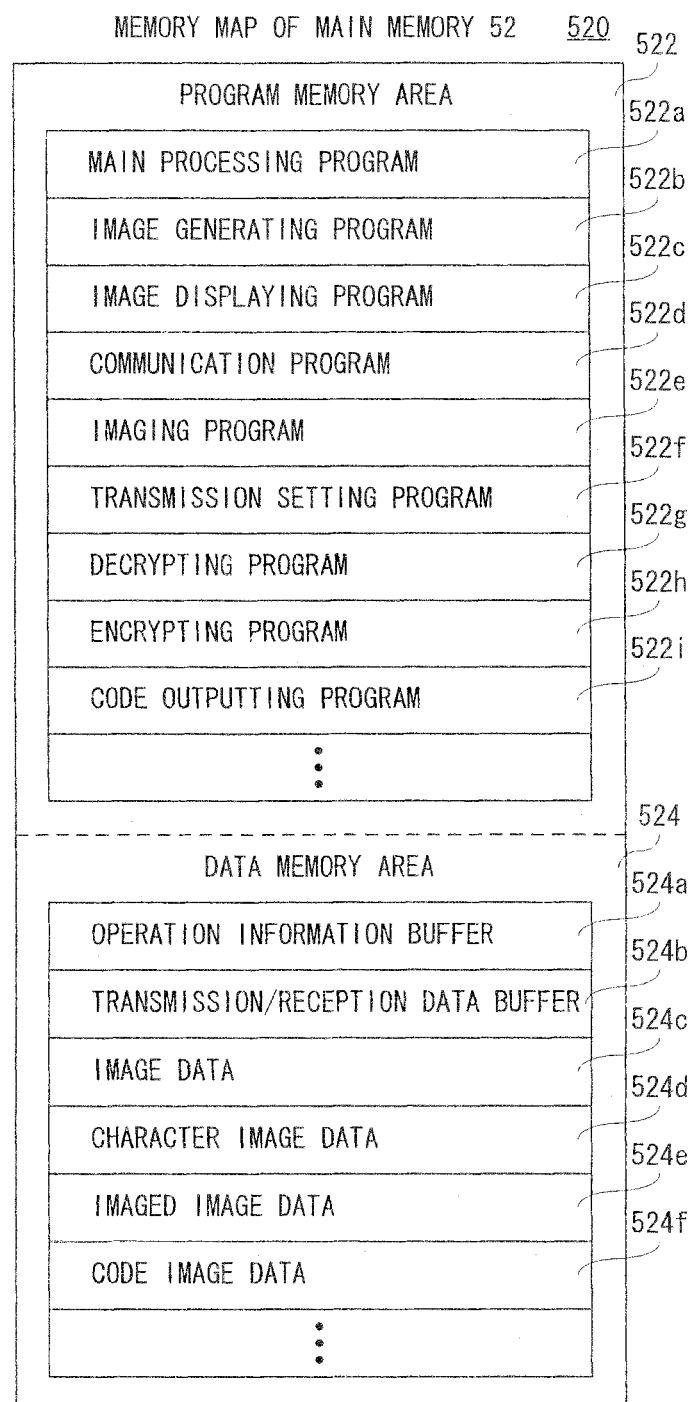
FIG. 7 is an illustrative view showing one example of a memory map of a main memory shown in FIG. 3.

On the character selecting screen 100, a copy of the character information data as to the character selected by the player is stored (temporarily stored) in a transmission/reception data buffer 524b (see FIG. 7). It should be noted that the character for which the transmission allowable flag is set to a non-transmittable state cannot be transmitted to another game apparatus 10. Thus, it cannot be selected as a character to be transmitted. Although the illustration is omitted, in a case that the character which cannot be selected as a character to be transmitted is designated, a message indicating that this character cannot be transmitted and another character should be selected is displayed. As another embodiment, the character for which the transmission allowable flag is set to a non-transmittable state may not be displayed on the character selecting screen 100. This holds true for a case that the character selecting screen 100 is displayed hereafter.

Then, the character information data stored in the transmission/reception data buffer 524b is transmitted to the game apparatus 10 (another game apparatus 10) of the communication partner.

Here, in the method (1), after a communication state between the game apparatus 10 and another game apparatus 10 is established, a character is selected, but before starting the communication processing, a character has already been selected.

Furthermore, when a communication state with another game apparatus 10 is established according to an operation by the player, character information data transmitted from the other game apparatus 10 being a communication partner is received, temporarily stored in the transmission/reception data buffer 524b, and then, a character is generated on the basis of the received character information data. Thus, a received character displaying screen 200 as shown in FIG. 5(B) is displayed on the second LCD 18. More specifically, on the basis of the favorite color, the body height and the body shape, each parts and the associated information included in the character information indicated by the character information data, image data of the character (character image data) is generated. First, as described above, a facial image of the character is generated. Furthermore, on the basis of the body height and body shape, the length and width of the torso of the character are set. In addition, the color of the clothes is represented by the favorite color. Thus, the character image data is generated. This holds true for a case that a character is generated hereafter. Then, a character 202 corresponding to the generated character image data is displayed on the second LCD 18 of the game apparatus 10.

Additionally, as shown in FIG. 5(B), a button image 210 and a button image 212 are displayed on the received character displaying screen 200. For example, when the button image 210 is turned on, the received character 202 is stored (permanently registered). On the other hand, when the button image 212 is turned on, the received character 202 is not stored. Accordingly, when the player turns the button image 210 on, that is, when storing the received character 202 is decided, the character image data corresponding to this character 202 is stored in the character permanent registration memory area 5640 of the memory for saved data 56. On the other hand, when the player turns the button image 212 on, that is, when not storing the received character 202 is decided, the character information data corresponding to this character 202 is erased.

Here, in this embodiment, in a case that the received character is not stored, the character information data corresponding to this character 202 is erased, but this may be stored in a character temporary memory area 5642 of the memory for saved data 56.

For example, in this method (1), by using the local communication module 66 of the game apparatus 10, communication processing is executed with the same kind of game apparatus 10. Here, processing of searching another game apparatus 10 being a communication partner is similar to that of the above-described in-passing communication.

Furthermore, in the method (1), communication processing is started with another game apparatus 10 by a short distance wireless communication to thereby transmit and receive the character information data, but by using the wireless communication module 64, the character information data may be transmitted and received with another game apparatus 10 via the Internet. That is, there is no need of being restricted to the short distance wireless communication.

Here, in the communication processing, one of the two game apparatuses 10 functions as a parent device, and the other functions as a child device, and therefore, the aforementioned character information data transmitting processing and character information data receiving processing change their places between a case that the parent device first executes a data transmission and a case that the child device first executes a data transmission.

Although illustration is omitted, all the characters which are permanently registered in the game apparatus 10 are displayed on the first LCD 16. Thus, when the received character 202 is permanently registered, that is, when the character information data of the character 202 is stored in the character permanent registration memory area 5640, this character 202 is displayed so as to be added to the characters which have been already displayed.

In a case that the method (2) is selected, that is, when the game apparatus 10 is set to the sleep mode, the in-passing communication processing is intermittently executed, so that the game apparatus 10 searches another game apparatus 10 which is able to make a communication. When another game apparatus 10 which is able to make a communication is detected, character information data is transmitted to and received from the other game apparatus 10, and the character information data (characters) are exchanged. Here, the game apparatus 10 transmits the character information data previously stored in the transmission data memory area 5644 of the memory for saved data 56 (see FIG. 8) to the other game apparatus 10. That is, in the game apparatus 10, a character is selected in advance, and the character information data corresponding to the selected character is stored in the transmission data memory area 5644 of the memory for saved data 56. Here, a copy of the character information data corresponding to the selected character is stored in the transmission data memory area 5644. That is, the character information data is copied.

It should be noted that a fact that the character selecting screen 100 shown in FIG. 5(A) is displayed on the second LCD 18 in a case that the character is selected is the same as the method (1).

Furthermore, in this embodiment, in a case of the in-passing communication, only the character information data corresponding to the character created by the player can be transmitted. Accordingly, in the in-passing communication, when the character information data is transmitted, in a case that the transmission allowable flag indicates a transmittable state, and an MAC address set as a creator ID included in the character information data and an MAC address as to the game apparatus 10 are compared, and only when both match, the character information data is transmitted.

In addition, a character based on the character information data received by the in-passing communication processing is displayed on the second LCD 18 when the sleep mode makes a transition to the normal mode. Although the illustration is omitted, a screen (registration screen) similar to the received character displaying screen 200 shown in FIG. 5(B) is displayed on the second LCD 18. It should be noted that in the in-passing communication, the received character information data is stored in the character temporary memory area 5642 of the memory for saved data 56. Accordingly, in this embodiment, it is determined whether or not the character (character information data) received by the in-passing communication is permanently registered on the registration screen.

Here, a button image for deciding that the character is permanently registered and a button image for deciding that the character is not permanently registered are displayed on the registration screen (not illustrated). It should be noted that in the in-passing communication, a plurality of characters (character information data) may be sometimes received, and in such a case, a plurality of characters are displayed, and for each of the plurality of characters, whether or not it is permanently registered can be decided.

Here, when it is decided that the character received by the in-passing communication is permanently registered, the character information data corresponding to the character is stored in the character permanent registration memory area 5640. On the other hand, when it is decided that the character received by the in-passing communication is not permanently registered, the character information data corresponding to the character remains to be stored in the character temporary memory area 5642. These decisions are executed on all the characters (character information data) received by the current in-passing communication.

Although the detailed explanation is omitted, in the in-passing communication processing, for example, time stamping is performed on the received character information data on reception. Furthermore, dates and times when the sleep mode starts and ends (makes a transition to the normal mode) are stored. Accordingly, with reference to the date and time, the character based on the character information data received in the sleep mode immediately before is created and displayed when the registration screen is displayed.

Furthermore, although the detailed explanation is omitted, by using a character according to the character information data stored in the character permanent registration memory area 5640, game processing as to a certain game can be executed. For example, it is possible to use the character as a player character and a non-player character.

In addition, in this embodiment, the number of character information data (characters) capable of being stored in the character permanent registration memory area 5640 (maximum number) and the maximum number of the character information data (characters) stored in the character temporary memory area 5642 are decided in advance. In the character permanent registration memory area 5640, character information data of a maximum of 100 characters, for example, can be stored, and the registration and the erasure thereof are operated by the player. On the other hand, in the character temporary memory area 5642, character information data of a maximum of 1000 characters, for example, can be stored, and the character information data received by the in-passing communication is automatically stored, and when the stored number is above the maximum number, the character information data is automatically erased (deleted) from the character temporary memory area 5642 from the oldest one.

Thus, in the game apparatus 10, character information data is exchanged by a communication with another game apparatus 10, etc., and on the basis of the received character information data, a new character can be acquired. However, in the game apparatus 10 that cannot be placed under a communication environment, a new character cannot be acquired. So, in this embodiment, by a method except for the communication, a new character is acquired.

For example, with the use of the camera 34 (or 32) of the game apparatus 10, by imaging a QR Code (registered trademark of Denso Wave Incorporated), acquiring a character is made possible.

In FIG. 6(A)-FIG. 6(E), examples of the QR Code (Example 1-Example 5) are displayed. However, these are simple examples, and from them, no information (character, here) is actually acquired.

In the example 1 of the QR Code shown in FIG. 6(A), a generic name of a character is described at the center thereof, and below the QR Code (outside), a character name is described. Accordingly, the player who views the example 1 of the QR Code can acquire character information data of the character to be used in the game apparatus 10, and know the kind of the acquirable character. Thus, by showing (teaching) the generic name of the character and the character name, the player can acquire a desired character.

Figure 6:
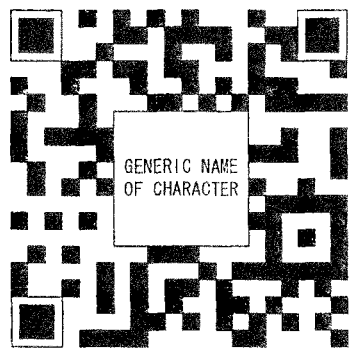
FIG. 6 is an illustrative view showing examples of a QR Code capable of acquiring a character in this embodiment and data structure of character data obtained from the QR Code.
Figure 6:
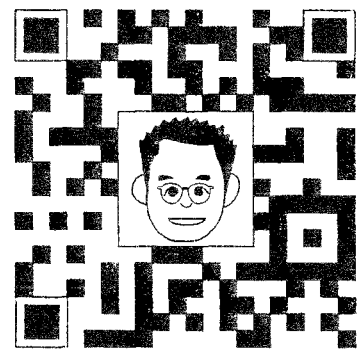
Figure 6:
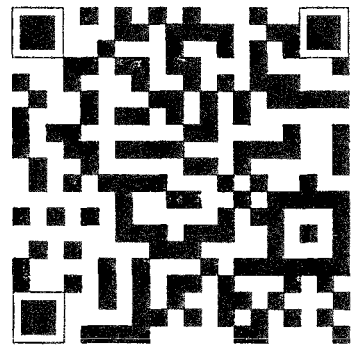
Figure 6:
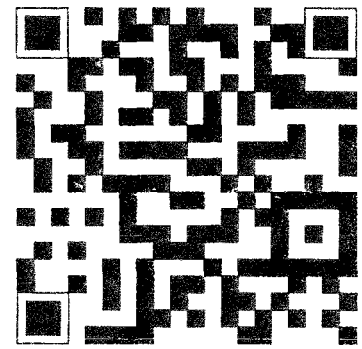
Figure 6:
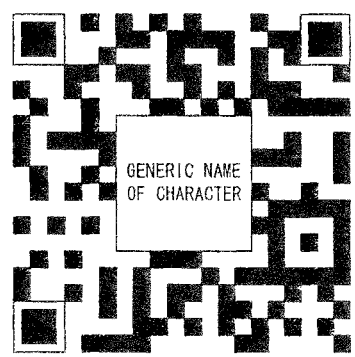

In the example 2 of the QR Code shown in FIG. 6(B), a facial image of a character is displayed at the center thereof. Accordingly, the player who views the example 2 of the QR Code can know that the character used in the game apparatus 10*a* can be acquired and know the kind of the acquirable character. For example, in a case that a great number of characters exist, by thus displaying the facial image to show (teach) the kind of the character, it is possible to prevent the player from redundantly acquiring the same kind of character.

The example 3 of the QR Code shown in FIG. 6(C) is for describing the generic name of the character similar to the example 1 of the QR Code shown in FIG. 6(A), but the generic name is described outside the QR Code. It should be noted that in FIG. 6(C), a character name is not displayed, and a specific content (kind) of the character is unclear, and therefore, the player can have an expectation and enjoyment, such as which character can be acquired.

The example 4 of the QR Code shown in FIG. 6(D) is for showing the kind of the character similar to the example 2 of the QR Code shown in FIG. 6(B), but the character name is described outside the QR Code. Here, in place of the character name, a facial image of the character may be displayed outside the QR Code.

In the example 5 of the QR Code shown in FIG. 6(E), unlikely to FIG. 6(C), a generic name of the character is described at the center thereof. Accordingly, the player who views the example 5 of the QR Code can know that the character information data as to the character to be used in the game apparatus 10 can be acquired.

In FIG. 6(A), FIG. 6(C) and FIG. 6(E), the generic name of the character is described, but logos indicating the generic name of the character, a name of a title of an animation, and a title of a game (game software) may be described.

For example, such a QR Code is obtained by encrypting the above-described character information data as to the character information, and coding the encrypted character information data into two-dimensional information.

Here, a format for encrypting the character information data can adopt an arbitrary format. In correspondence with the adopted format for encryption, a decrypting program 522*g* and an encrypting program 522*h* described later are decided.

The QR Code as described above is printed on a magazine, a card, or displayed on a screen of a predetermined home page and a site on the Internet. Accordingly, when the player instructs the game apparatus 10 to read the QR Code, the outward camera 34 is activated to start reading the QR Code. At this time, the outward camera 34 executes auto-focusing, and displays a through image on the first LCD 16.

Then, when focusing is obtained, a still image (QR Code image) imaged by the outward camera 34 is captured. Thereafter, in the game apparatus 10, encrypted character information data is calculated (decrypted) from the image data of the QR Code. In addition, in the game apparatus 10, the encrypted character information data is decrypted. Then, as described above, a character is generated on the basis of the character information data, and a screen (not illustrated) similar to the received character display screen 200 shown in FIG. 5(B) is displayed. A point that the player decides whether or not the character acquired from the QR Code is to be stored is the same as the case that it is decided whether or not the received character in the method (1) is to be stored. When the player decides to store the character acquired from the QR Code, character information data corresponding to the character is stored in the character permanent registration memory area 5640. On the other hand, when the player decides not to store the character acquired from the QR Code, the character information data corresponding to the character is erased. Here, the character information data may be stored in the character temporary memory area 5642 without erasing it.

Furthermore, in the game apparatus 10, image data (code image data) of the QR Code is generated from the character data, and the QR Code can be displayed on the screen, or the code image data can be output to the memory card 26 or the memory card 28.

In the former, when the player instructs the game apparatus 10 to display the QR Code, the character selecting screen 100 shown in FIG. 5(A) is displayed on the second LCD 18. The player selects a desired character by utilizing the character selecting screen 100. Then, character information data as to the character is read and encrypted. Next, the encrypted character information data is converted into image data of the QR Code (code image data). The code image data is stored in the code image data memory area 5646 (see FIG. 8) of the memory for saved data 56. Thereafter, a QR Code corresponding to the code image data is displayed on the first LCD 16, for example. In such a case, the image data is output to the first LCD 16.

In this case, by making another game apparatus 10 image the QR Code displayed on the first LCD 16, it is possible to give the character to the other game apparatus 10. On the contrary thereto, by imaging a QR Code displayed on a first LCD 16 of the other game apparatus 10, it is possible to give a character as described above. Accordingly, even in a place where a wireless communication is prohibited, for example, it is possible to exchange characters, and acquire a new character.

In the latter, when the player instructs the game apparatus 10 to output the QR Code to the memory card, the character selecting screen 100 shown in FIG. 5(A) is displayed on the second LCD 18. The player selects a desired character by using the character selecting screen 100. Then, similar to the former case, character information data as to the character is read, and encrypted. Next, the encrypted character information data is converted into the code image data. The code image data is stored in the code image data memory area 5646 of the memory for saved data 56. Thereafter, the code image data is output to the designated memory card 26 or memory card 28.

In this case, the memory card 26, 28 is exchanged with the player by mail, for example, and each player displays the QR Code corresponding to the image data stored in the memory card 26, 28 on the screen of the computer, and images it with the game apparatus 10, whereby it is possible exchange the characters.

Additionally, in this embodiment, the code image data is output to the memory card 26, 28, but there is no need of being restricted thereto. For example, it may be possible to transmit electronic mail and message data with code image data as an attached file to a predetermined destination, or upload a predetermined server on a network. For example, in a case of being uploaded to the predetermined server, a new character (character information data) may be downloaded from the predetermined server.

Furthermore, by execution of an application program, a copy of the character information data stored in the memory card 26 and the memory card 28 is store to thereby acquire a new character. In such a case, the application program stored in the memory for saved data 56 of the game apparatus 10 is executed, or the application program stored in the memory card 26 and the memory card 28 attached to the game apparatus 10 is executed. A copy of the character information data as to the character displayed according to an instruction from the running application is acquired from the memory card 26 and the memory card 28 according to an instruction from the player, and stored in the character permanent registration memory area 5640 of the memory for saved data 56.

For example, when new game software is sold, character image data of a certain character is stored in the memory cards 26, 28 together with the game program as a privilege (bonus) so as to be given to the player who buys the game software.

FIG. 7 is an illustrative view showing a memory map 520 of the main memory 52 shown in FIG. 3. As shown in FIG. 7, the main memory 52 includes a program memory area 522 and a data memory area 524. In the program memory area 522, a game program is stored, and the game program is constructed of a main processing program 522*a*, an image generating program 522*b*, an image displaying program 522*c*, a communication program 522*d*, an imaging program 522*e*, a transmission setting program 522*f*, a decrypting program 522*g*, an encrypting program 522*h*, a code outputting program 522*i*, etc.

The main processing program 522*a* is a program for processing a main routine of a virtual game (portrait creating game) of this embodiment. The image generating program 522*b* generates game image data for displaying a screen (100, 200, etc.) by using image data 524*c* described later. The image displaying program 522*c* displays game image data generated according to the image generating program 522*b* on the first LCD 16 or the second LCD 18, or both of them as a screen.

The communication program 522*d* is a program for communicating with other game apparatuses 10, computers, or access points. The imaging program 522*e* is a program for executing imaging processing (normal imaging processing and QR Code imaging processing).

More specifically, when the normal imaging processing is selected (designated), the imaging program 522*e* is executed to activate the inward camera 32 or the outward camera 34, and display a through image on the first LCD 16 (or the second LCD 18). Then, when the player turns the shutter button (L button 20*i* or R button 20*j*) on, a still image when the shutter button is turned on is captured, and imaged image data 524*e* corresponding to the still image is temporarily stored in the data memory area 524 of the main memory 52. The imaged image data 524*e* is then used in the processing of the portrait creating game according to an operation by the player, stored in the memory card 26, 28 and the memory for saved data 56, or erased (deleted).

Furthermore, when the QR Code imaging processing is instructed, the imaging program 522e is executed to activate the outward camera 34, to execute auto-focusing processing, and to display a through image on the second LCD 18 (the first LCD 16 may be possible). Then, when a focusing state is obtained, a still image (image of the QR Code) at that time is captured, and the imaged image data 524e corresponding to the still image is temporarily stored in the data memory area 524 of the main memory 52. From this imaged image data 524e, encrypted character information data is calculated. Thereafter, the encrypted character information data is decrypted according to the decrypting program 522g described later to thereby acquire the character information data.

The transmission setting program 522f is a program for setting a character selected according to an instruction from the player to be transmittable. More specifically, the character information data as to the character selected by the player is stored in the transmission data memory area 5644 (see FIG. 8) of the memory for saved data 56. The decrypting program 522g is a program for decrypting encrypted character information data. The encrypting program 522h is a program for encrypting character information data. The code outputting program 522i converts the encrypted character information data into a QR Code, and outputting image data (code image data) as to the converted QR Code. As described above, the code image data is output to the first LCD 16 (or second LCD 18) of the game apparatus 10. Accordingly, the QR Code is displayed on the screen. Alternatively, the code image data is output (transmitted) to the memory card 26, 28 attached to the game apparatus 10.

Although illustration is omitted, the game program includes a sound outputting program and a backup program, etc. The sound outputting program is a program for outputting sound necessary for the game, such as a voice or an onomatopoeic sound of a character, a sound effect, music (BGM) by using sound data not shown. The backup program is a program for storing (saving) game data (proceeding data, result data) in the memory cards 26, 28 and the memory for saved data 56 according to an instruction from the player and according to a predetermined event.

In the data memory area 524, an operation information buffer 524a and a transmission/reception data buffer 524b are provided. The operation information buffer 524a stores (temporarily stores) operation data from the operation button 20 and touch position data from the touch panel 22 in chronological order. The operation data and the touch position data are erased after being used in the processing by the CPU 50.

The transmission/reception data buffer 524b stores (temporarily stores) data to be transmitted and received data when data is transmitted and received in a communication other than the in-passing communication. For example, the data to be transmitted is erased in a case that it is confirmed that the data to be transmitted is received in another game apparatus 10, etc., or in a case that a predetermined period of time elapses. Furthermore, the received data is erased in a case that it is moved to the memory cards 26, 28 or the memory for saved data 56, or in a case that it is used by the processing by the CPU 50.

Furthermore, in the data memory area 524, image data 524c, character image data 524d, imaged image data 524e and code image data 524f are stored. The image data 524c is data for generating game image data, such as polygon data, texture data, etc. and data of a plurality of kinds of parts images as to each of the above-described parts. The character image data 524d is image data of a character generated according to the character information data. The imaged image data 524e is image data of a still image (image of the QR Code) imaged according to the imaging program 522e. The code image data 524f is image data as to the above-described QR Code.

Although the illustration is omitted, in the data memory area, other data, such as sound data is stored, and a timer (counter) and a register necessary for the processing by the game apparatus 10 are also provided.

Figure 8:
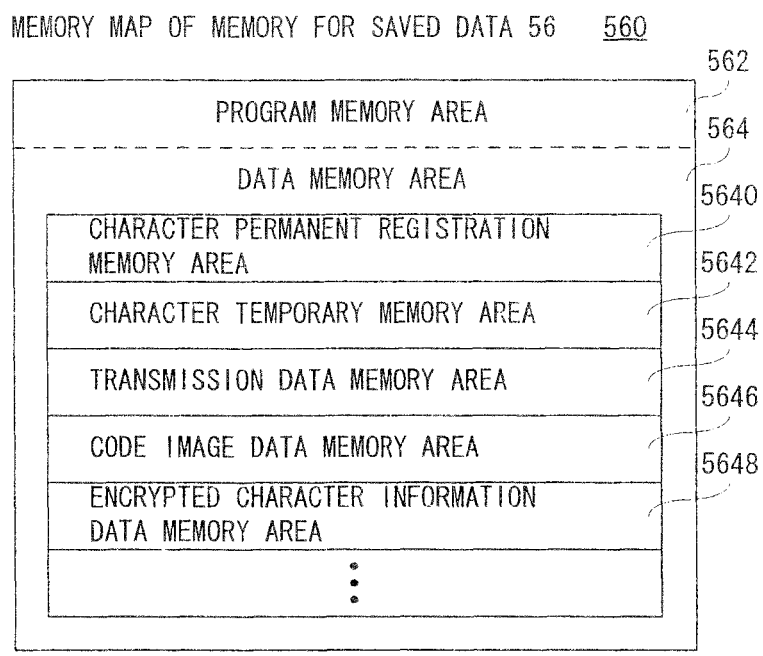
FIG. 8 is an illustrative view showing one example of a memory map of a data memory for saved data shown in FIG. 3.

FIG. 8 is an illustrative view showing a memory map 560 of the memory for saved data 56 shown in FIG. 3. The memory for saved data 56 includes a program memory area 562 and a data memory area 564. In the program memory area 562, an application program, such as a game program, etc. is installed (stored). The data memory area 564 further includes a character permanent registration memory area 5640, a character temporary memory area 5642, a transmission data memory area 5644, a code image data memory area 5646, an encrypted character information data memory area 5648, etc.

The character permanent registration memory area 5640 stores character information data as to the character that is permanently registered in the game apparatus 10. For example, the number of information data capable of being stored in the character permanent registration memory area 5640 is previously decided. In this embodiment, the character information data of a maximum of 100 characters can be stored. The character information data stored in the character permanent registration memory area 5640 can be erased (deleted) by only an operation by the player.

The character temporary memory area 5642 stores character information data as to the character temporarily (tentatively) registered in the game apparatus 10. That is, character information data as to the character that the player has not decided to permanently register or to erase is stored. Here, the character information data is received from another game apparatus 10, etc. The number of character information data capable of being stored in the character temporary memory area 5642 is also previously decided. In this embodiment, the character information data of a maximum of 1000 characters can be stored. The character information data stored in the character temporary memory area 5642 is moved to the character permanent registration memory area 5640 only by an operation by the player, but when new character information data is stored, if the number is above the maximum number, the oldest character information data is automatically erased. It should be noted that it may be erased according to an operation by the player.

The transmission data memory area 5644 stores character information data of a character set to be transmitted to another game apparatus 10 in the in-passing communication processing. In this embodiment, a copy of the character information data as to the character selected by the player is stored in the transmission data memory area 5644. Furthermore, a copy of the character information data stored in the transmission data memory area 5644 is transmitted to another game apparatus 10, etc., and therefore, it is possible to exchange character information data among a plurality of game apparatuses 10, etc.

The code image data memory area 5646 stores code image data generated when a QR Code is displayed on the screen, and when the code image data is output to the memory cards 26, 28. The encrypted character information data memory area 5468 stores encrypted character information data in the code outputting processing.

Additionally, as described above, the character image data acquired by an exchange is stored in the character temporary memory area 5642.

Figure 9:
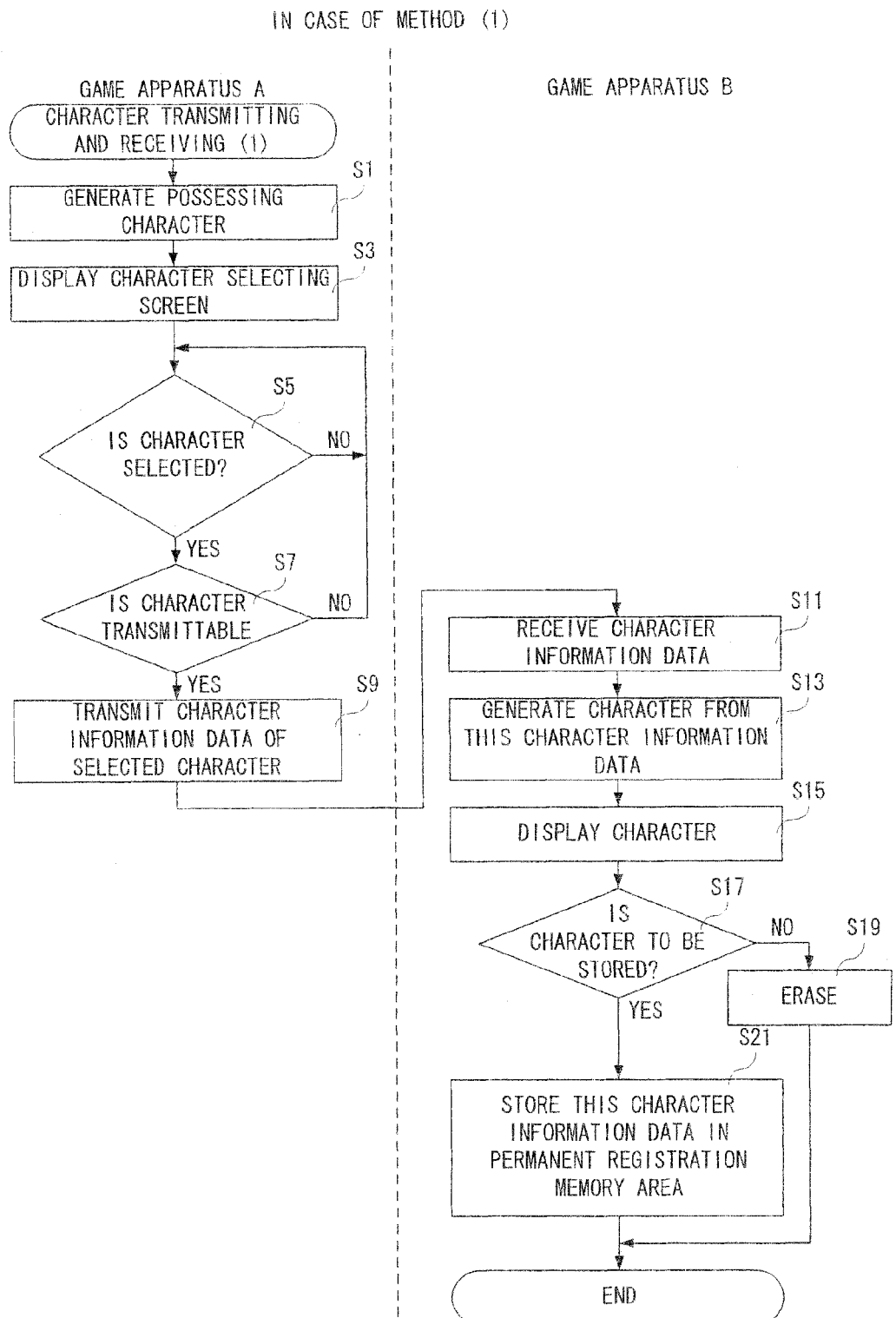
FIG. 9 is a flowchart showing character transmitting and receiving processing to be executed between two game apparatuses in a case of a method (1)

FIG. 9 shows a processing of transmitting and receiving character information data between the two game apparatuses 10 when the method (1) is selected (character transmitting and receiving processing (1)). Here, for the sake of convenience of description, the game apparatus 10 being a transmitting end of the character information data shall be a game apparatus A, and the game apparatus 10 being a receiving end of the character information data shall be a game apparatus B. Furthermore, in this embodiment, the character information data is exchanged, so that after the character transmitting and receiving processing (1) is executed with one of the game apparatus 10 being the game apparatus A and the other of the game apparatus 10 being the game apparatus B, the character transmitting and receiving processing (1) is executed with one of the game apparatus 10 being the game apparatus B, and the other of the game apparatus 10 being the game apparatus A. It should be noted that the processing of searching a communication partner shall be executed before the transmitting and receiving processing (1) is started. These matters are true for the method (2) described later.

Here, in a case that the character information data is not exchanged, the character transmitting and receiving processing (1) may be executed once with the game apparatus 10 at the transmitting end being the game apparatus A and the game apparatus 10 at the receiving end being the game apparatus B.

As shown in FIG. 9, when starting the character transmitting and receiving processing (1), the CPU 50 of the game apparatus A generates a possessing character in a step S1. That is, a character as to each of all the character information data stored in the character permanent registration memory area 5640 and the character temporary memory area 5642 is created. This holds true for a case that a possessing character is created.

In a next step S3, the character selecting screen 100 as shown in FIG. 5(A) is displayed on the second LCD 18. In a succeeding step S5, it is determined whether or not a character is selected.

If "NO" in the step S5, that is, if a character is not selected, the process returns to the same step S5. On the other hand, if "YES" in the step S5, that is, if a character is selected, it is determined whether or not the character is transmittable in a step S7. Here, the CPU 50 determines whether or not the transmission allowable flag indicates a transmittable state with reference to the character information data of the selected character.

Here, in the step S7, whether the character is transmittable or not is determined based only on the transmission allowable flag, but whether the character is transmittable or not may be determined on the basis of the further NG word check result flag. Furthermore, similar to the in-passing communication (method (2)), in a case that only the character created by the player is made transmittable, it is determined whether or not a creator ID (MAC address) and an MAC address as to the game apparatus 10 match with each other. These hold true for code outputting processing (1) and code outputting processing (2) described later (see FIG. 13, FIG. 14).

If "NO" in the step S7, that is, if the character is not transmittable, the process returns to the step S5. Here, at this time, a message indicating that the character cannot be selected and another character should be selected is displayed. On the other hand, if "YES" in the step S7, that is, if a character is transmittable, character information data as to the selected character is transmitted to another game apparatus 10 (game apparatus B, here) being a communication partner in a step S9.

And, the CPU 50 of the game apparatus B receives the character information data in a step S11, generates a character from the character information data, that is, draws an image of the character in a step S13, and displays the generated character in a step S15. That is, the received character displaying screen 200 shown in FIG. 5(B) is displayed on the second LCD 18.

In a following step S17, it is determined whether or not the character is to be stored. That is, the CPU 50 determines whether the button image 210 is turned on or the button image 212 is turned on. If "NO" in the step S17, that is, if the character is not stored, the character information data is erased in a step S19, and the character transmitting and receiving processing (1) is ended. On the other hand, if "YES" in the step S17, that is, if the character is stored, the character information data is stored in the permanent registration memory area 5640 in a step S21, and the character transmitting and receiving processing (1) is ended. Strictly speaking, the received character information data has been temporarily stored in the transmission/reception data buffer 524b, and thus, in the step S21, the character information data temporarily stored is moved (stored in) to the character permanent registration memory area 5640.

Although the illustration is omitted, in a case that the received character information data is stored, the character as to the received character information data is then displayed so as to be added to the characters which have already been permanently registered in the game apparatus 10, and are displayed on the first LCD 16. This holds true for character acquiring processing (1) and character acquiring processing (2) described later.

In the character transmitting and receiving processing (1) shown in FIG. 9, when the character information data is transmitted, it is determined whether or not the character information data (character) is transmittable, but when a possessing character is generated in the step S1, whether or not the character information data is transmittable is determined, and the non-transmittable characters may not be displayed on the character selecting screen in the step S3.

Figure 10:
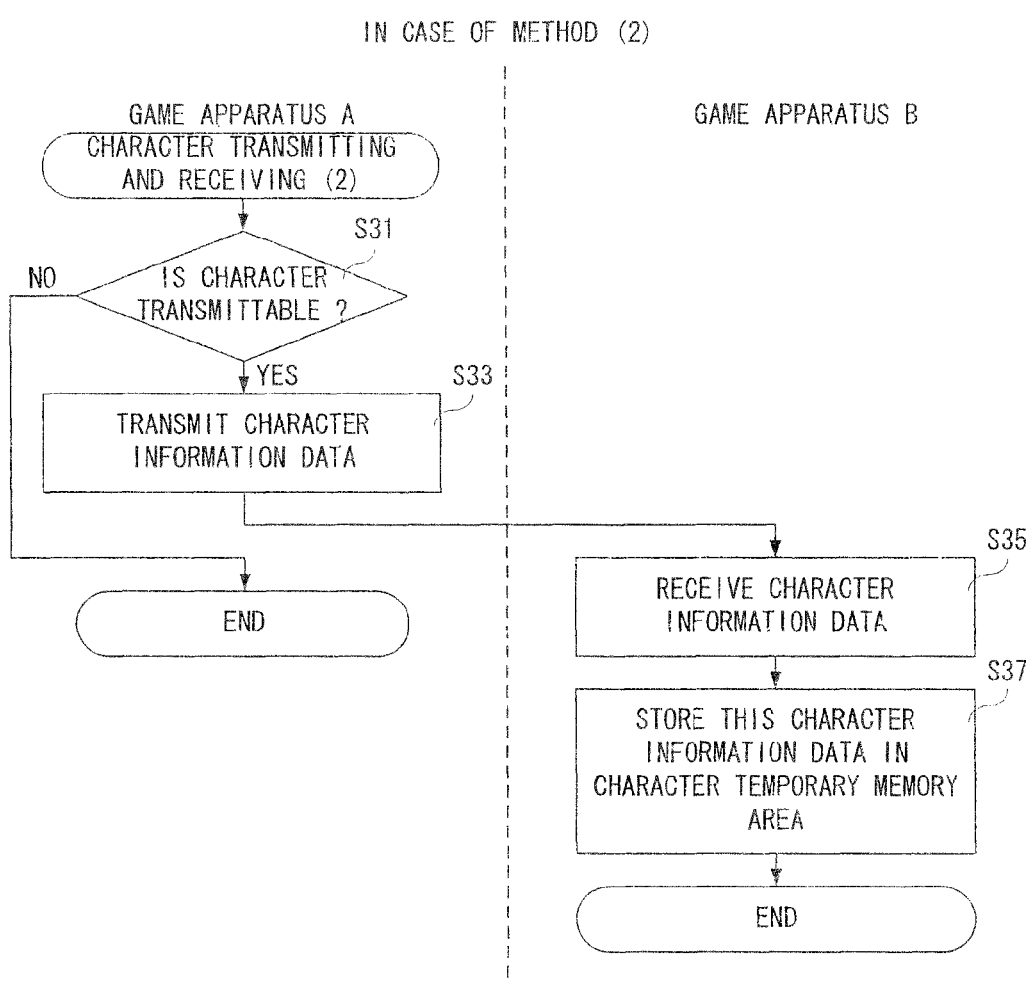
FIG. 10 is a flowchart showing character transmitting and receiving processing to be executed between two game apparatuses in a case of a method (2)

FIG. 10 is a flowchart showing character transmitting and receiving processing (2) executed between the two game apparatuses 10 in a case that the above-described method (2) is selected. As shown in FIG. 10, when starting the character transmitting and receiving processing (2), the CPU 50 of the game apparatus A determines whether or not character information data stored in the transmission data memory area 564 is transmittable in a step S31. Here, the CPU 50 determines whether or not the character information data is a transmittable state with reference to the transmission allowable flag included in the character information indicated by the character information data. Furthermore, the CPU 50 determines whether a character created by this game apparatus 10 or not with reference to the creator ID, and depending on whether the creator ID matches the MAC address of the game apparatus 10.

As described above, with further reference to the NG word check result flag, it may be possible to determine whether or not the character information data is transmittable.

Furthermore, in the example shown in FIG. 10, when the character information data is transmitted, whether the character information data is transmittable or not is determined, but when the character selecting screen 100 for selecting a transmission object is displayed, the character which is not transmittable may not be displayed.

If "NO" in the step S31, that is, if the character information data is not transmittable, the transmitting and receiving processing (2) is ended as it is. On the other hand, if "YES" in the step S31, that is, if the character information data is transmittable, the character information data stored in the transmission data memory area 5644 is transmitted to the game apparatus B in a step S33. Thereupon, the CPU 50 of the game apparatus B receives the character information data in a step S35, and stores the character information data in a character temporary memory area 5642 in a step S37, and ends the character transmitting and receiving processing.

As described above, in a case of the method (2), the character based on the transmitted and received character information data is generated and displayed when the sleep mode makes a transition to the normal mode.

Figure 11:
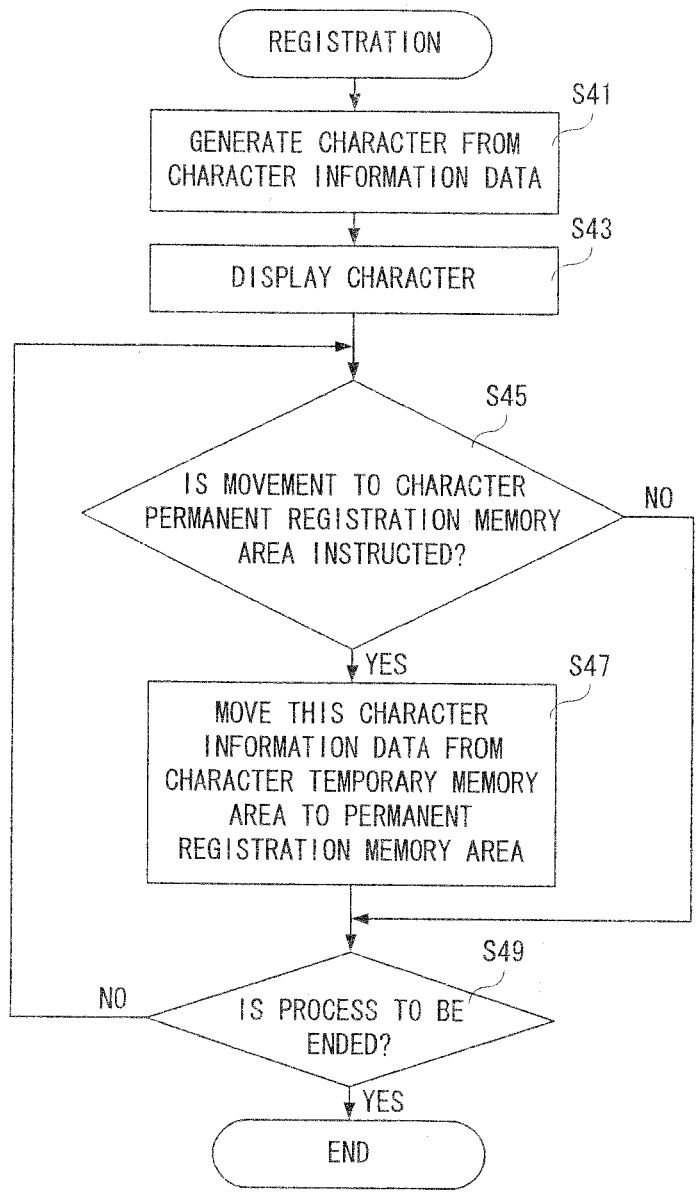
FIG. 11 is a flowchart showing registering processing by a CPU shown in FIG. 3.

FIG. 11 is a flowchart showing registering processing of permanently registering the character information data received by the in-passing communication processing. The registering processing is executed in transition from the sleep mode to the normal mode in a case that the character information data has been received in the sleep mode.

As shown in FIG. 11, when starting the registering processing, the CPU 50 generates a character from the character information data stored in the character temporary memory area 5642 in a step S41. Here, characters based on all the character information data received in the sleep mode immediately before are generated. In a next step S43, the characters generated in the step S41 are displayed.

Successively, in a step S45, it is determined whether or not a movement to the character permanent registration memory area 5640 is instructed. If "NO" in the step S45, that is, if a movement to the character permanent registration memory area 5640 is not instructed, the process directly proceeds to a step S49. On the other hand, if "YES" in the step S45, that is, if a movement to the character permanent registration memory area 5640 is instructed, the character information data is moved from the character temporary memory area 5642 to the character permanent registration memory area 5640 in a step S47, and the process proceeds to the step S49. That is, in the step S47, the CPU 50 stores a copy of the character information data in the character permanent registration memory area 5640, and then erases the character information data from the character temporary memory area 5642.

In the step S49, it is determined whether or not the process is to be ended. That is, the CPU 50 determines whether or not the registering processing (S45 and S47) is to be ended as to all the character information data received by the in-passing communication in the sleep mode immediately before, or whether or not an instruction of a registration end is input by the player. If "NO" in the step S49, that is, if the processing is not to be ended, the process returns to the step S45. On the other hand, if "YES" in the step S49, that is, if the processing is to be ended, the registering processing is ended.

It should be noted that in this embodiment, in the registering processing shown in FIG. 11, only the character information data received in the sleep mode immediately before is an object to be permanently registered, but all the character information data stored in the character temporary memory area 5642 may be objects to be permanently registered. This allows the information data which was selected as not being permanently registered to be permanently registered thereafter. In such a case, the registering processing may be executed not only when the sleep mode makes a transition to the normal mode but also when there is an instruction from the player.

Figure 12:
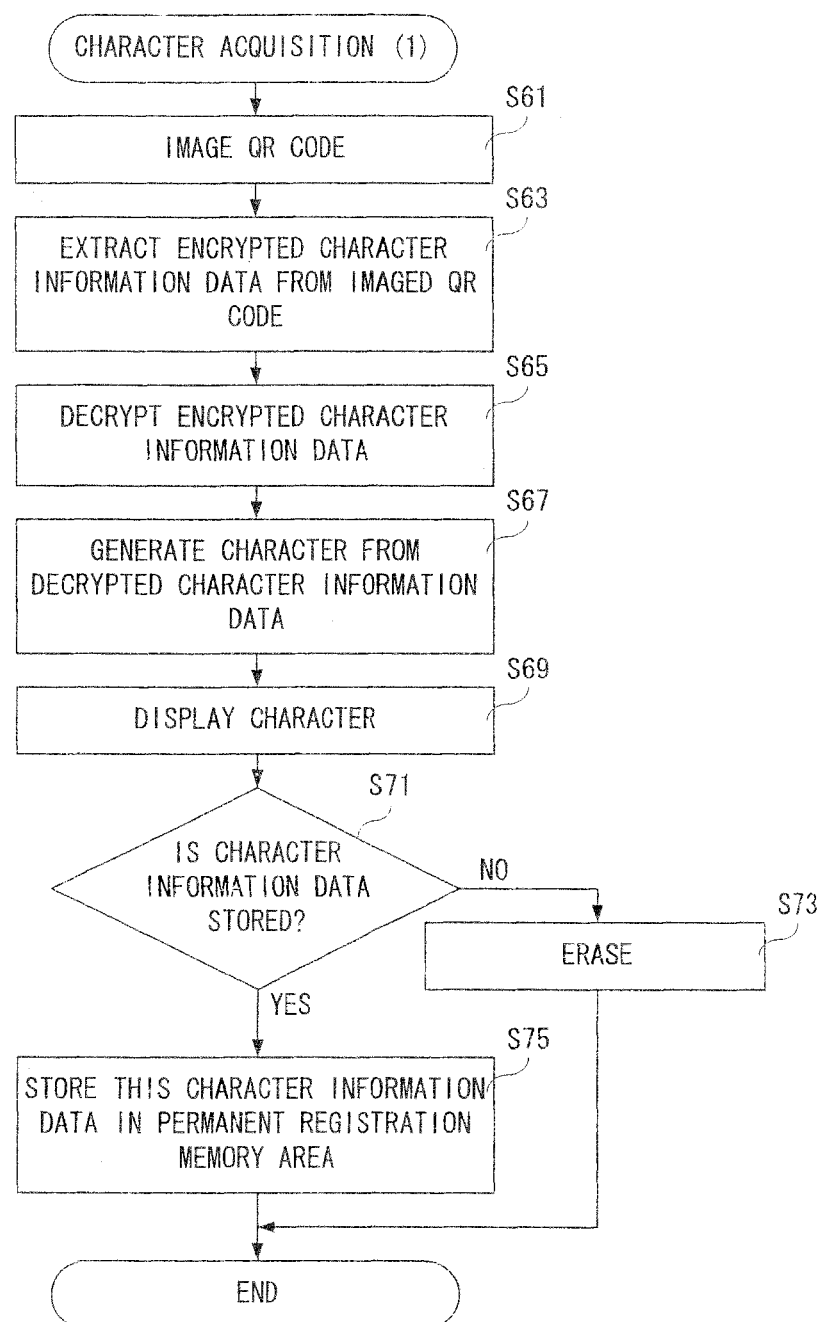
FIG. 12 is a flowchart showing character acquiring processing (1) by the CPU shown in FIG. 3.

FIG. 12 is a flowchart showing the character acquiring processing (1). As shown in FIG. 12, when starting the character acquiring processing (1), the CPU 50 images a QR Code in a step S61. The QR Code imaging processing is as described above. In a next step S63, encrypted character information data is extracted from the imaged QR Code. That is, the CPU 50 interprets the image obtained by imaging the QR Code, and converts it to encrypted character information data. Successively, the encrypted character information data is decrypted in a step S65, a character is generated from the decrypted character information data in a step S67, and the character is displayed in a step S69. That is, a registration screen (not illustrated) similar to the received character displaying screen 200 as shown in FIG. 5(B) is displayed on the second LCD 18.

In a succeeding step S71, it is determined whether or not the character information data acquired from the QR Code is to be stored. That is, it is determined whether storing is instructed (decided) or not storing is instructed by the player. If "NO" in the step S71, that is, if the character information data acquired from the QR Code is not stored, this character information data is erased in a step S73, and the character acquiring processing (1) is ended. On the other hand, if "YES" in the step S71, that is, if the character information data acquired from the QR Code is stored, this character information data is stored in the character permanent registration memory area 5640 in a step S75, and the character acquiring processing (1) is ended.

Figure 13:
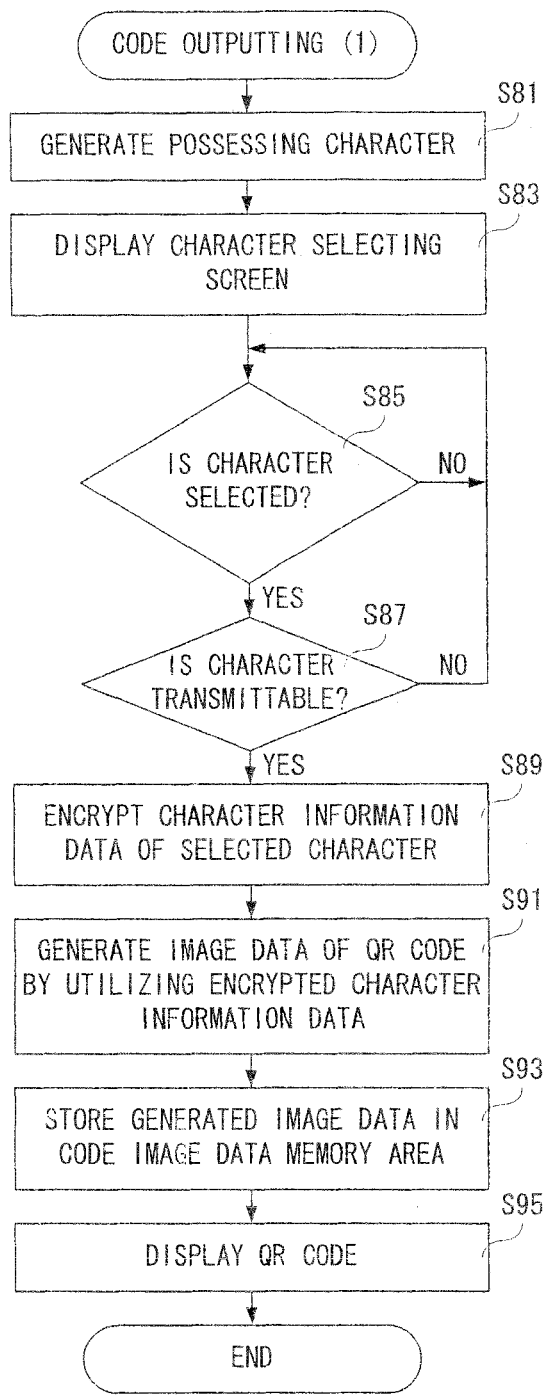
FIG. 13 is a flowchart showing code outputting processing (1) by the CPU shown in FIG. 3.

FIG. 13 shows a flowchart showing code outputting processing (1). As shown in FIG. 13, when starting the code outputting processing (1), the CPU 50 generates a possessing character in a step S81. In a next step S83, the character selecting screen 100 shown in FIG. 5(A) is displayed on the second LCD 18. In a succeeding step S85, it is determined whether or not a character is selected.

If "NO" in the step S85, the process returns to the same step S85. On the other hand, if "YES" in the step S85, it is determined whether or not the character is transmittable (can be output) in a step S87. That is, the CPU 50 determines whether or not the transmission allowable flag indicates the transmittable state with reference to the character information data as to the selected character.

Here, as described above, it may be possible to determine whether or not the character is transmittable (can be output) with further reference to the creator ID and the NG word check result flag.

If "NO" in the step S87, that is, if the character is not transmittable, the process returns to the step S85 as it is. Although illustration is omitted, a message indicating that the character cannot be selected and another character should be selected is displayed at this time. This holds true for code outputting processing (2) described later. On the other hand, if "YES" in the step S87, that is, if the character is transmittable, the character information data as to the selected character is encrypted in a step S89. Although illustration is omitted, the encrypted character information data is stored in the encrypted character information data memory area 5648 at this time.

In a next step S91, by using the encrypted character information data, image data of the QR Code (code image data) is generated. In a succeeding step S93, the generated code image data is stored in the code image data memory area 5646. Then, in a step S95, the QR Code is displayed, and then, the code outputting processing (1) is ended. For example, in the step S95, by using the code image data stored in the code image data memory area 5646, the QR Code is displayed on the first LCD 16 of the game apparatus 10.

It should be noted that in FIG. 13, when the character is selected, whether the character is transmittable (can be output) or not is determined, but when a possessing character is generated, it may be determined whether or not the character can be output, and the character which cannot be output may not be displayed on the character selecting screen so as not to be selected. This holds true for the code outputting processing (2).

Figure 14:
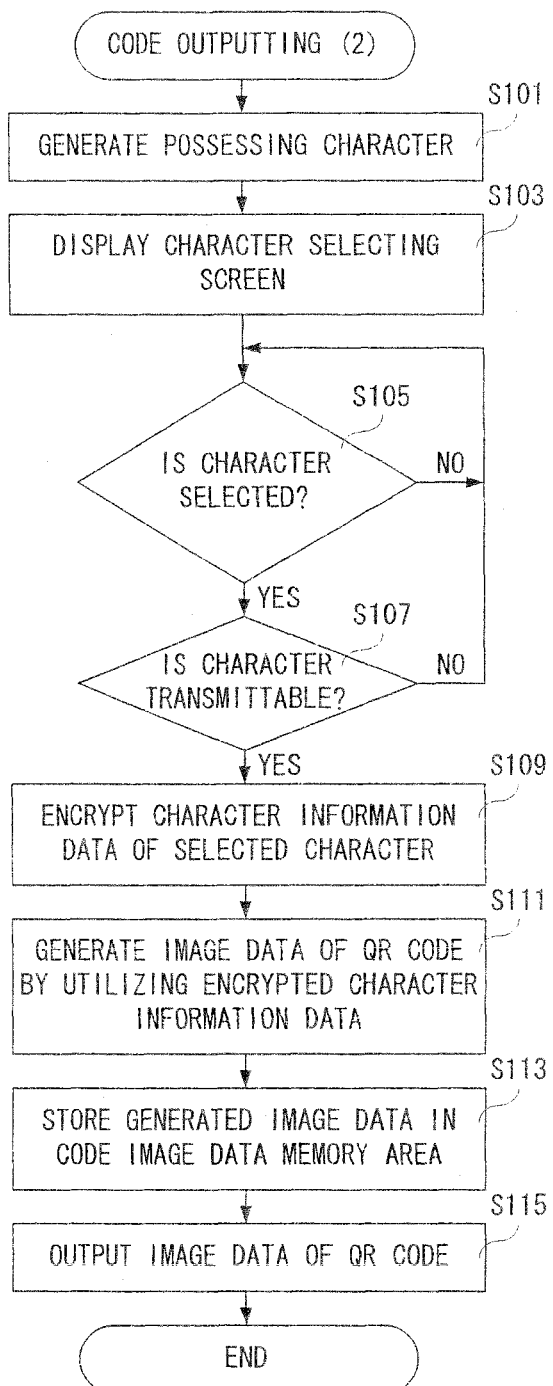
FIG. 14 is a flowchart showing code outputting processing (2) by the CPU shown in FIG. 3.

FIG. 14 is a flowchart showing the code outputting processing (2). As shown in FIG. 14, when starting the code outputting processing (2), the CPU 50 generates a possessing character in a step S101. In a next step S103, the character selecting screen 100 shown in FIG. 5(A) is displayed on the second LCD 18. In a succeeding step S105, it is determined whether or not a character is selected.

If "NO" in the step S105, the process returns to the same step S105. On the other hand, if "YES" in the step S105, it is determined whether or not the character is transmittable (can be output) in a step S107. If "NO" in the step S107, the process returns to the step S105 as it is. On the other hand, if "YES" in the step S107, the character information data as to the selected character is encrypted in a step S109. At this time, the encrypted character information data is stored in the encrypted character information data memory area 5468.

In a next step S111, code image data of the QR Code is generated by utilizing the encrypted character information data. In a succeeding step S113, the generated code image data is stored in the code image data memory area 5646. Then, in a step S115, image data of the QR Code is output, and the code outputting processing (2) is ended. For example, in the step S115, the code image data of the QR Code is output (written) to the memory cards 26, 28 attached to the game apparatus 10, for example.

It should be noted that in this embodiment, depending on the difference in an outputting method of the QR Code and an outputting destination, different output processing is performed. However, the same processing is performed until the code image data is generated, and therefore, it is possible to unify the code outputting processing by selecting whether the QR Code is displayed or the code image data is output to the memory cards 26, 28 after the code image data is generated.

Figure 15:
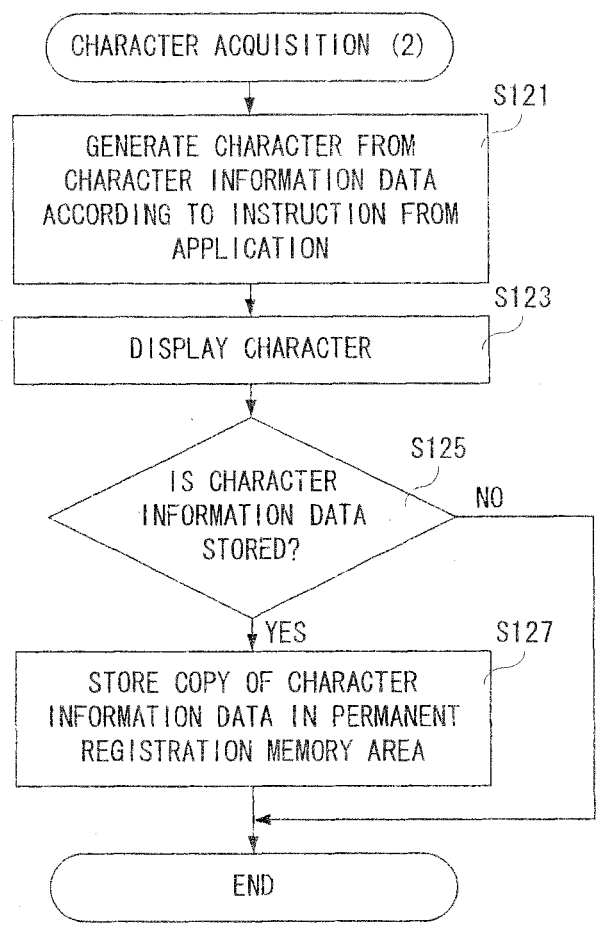
FIG. 15 is a flowchart showing character acquiring processing (2) by the CPU shown in FIG. 3.

FIG. 15 is a flowchart showing the character acquiring processing (2). As shown in FIG. 15, when starting the character acquiring processing (2), the CPU 50 generates a character from the character information data according to an instruction from the application in a step S121. Although the detailed explanation is omitted, the CPU 50 generates a character from the character information data stored in the memory cards 26, 28. In a next step S123, the generated character is displayed. Here, a registration screen (not illustrated) similar to the received character displaying screen 200 shown in FIG. 5(B) is displayed. The registration screen is a screen similar to that when a character is acquired from the QR Code. Thus, the redundant explanation is omitted.

Succeedingly, in a step S125, it is determined whether or not character information data is to be stored. If "NO" in the step S125, that is, if character information data is not stored, the character acquiring processing (2) is ended as it is. On the other hand, if "YES" in the step S125, that is, if character information data is stored, a copy of the character information data is read from the memory cards 26, 28, and is stored in the character permanent registration memory area 5640 in a step S127, and the character acquiring processing (2) is ended.

According to this embodiment, a character can be acquired independent of a communication, and thus, even a player who cannot create a communication environment can collect characters by obtaining a printed matter, such as a book, a card, etc. printed with a QR Code or a memory card storing image data of a QR Code, for example. That is, more users can acquire a new character.

In this embodiment, a QR Code is used, but other information such as a bar code may be utilized.

Furthermore, in this embodiment, when the sleep mode is set, in-passing communication processing is executed, but when the player does not use the game apparatus with the power on, in-passing communication processing may be executed.

In addition, in this embodiment, character image data is stored in the main memory, but may be stored in the same memory area (5640, 5642) in association with the corresponding character information data. In such a case, by using the character (character image data) generated once, it is possible to reduce a processing load as to generation and display of characters from the next time onward.

In addition, the configuration of the game apparatus need not be restricted to that of the embodiment. For example, one camera or no camera may be appropriate. In addition, the touch panel may be provided on the two LCDs.

Additionally, in this embodiment, a case that two handheld game apparatuses are communicated with each other is explained. But, the present invention can be applied to other portable information terminals that can be easily transported, such as a cellular phone, PDA, etc. if they can store the portrait game program of this embodiment. Similarly, this invention can be also applied to a console-typed game apparatus and a general-purpose computer that store the portrait game program of this embodiment. That is, a communication partner is a predetermined electronic appliance or a predetermined computer.

Although the present embodiments have been described and illustrated in detail, it is clearly understood that the same is by way of illustration and example only and is not to be taken by way of limitation, the spirit and scope of the present embodiments being limited only by the terms of the appended claims.

What is claimed is:

1. A game apparatus having a communicator, an imager, a memory device configured to store data relating character data with code data and a displayer, comprising:
   a character data receiver which receives character data from a connectable predetermined computer via said communicator;
   a code data acquirer which acquires code data by imaging a predetermined image by said imager, the code data being two dimensions matrix code coded character data;
   a character data calculator which calculates character data from the code data acquired by said code data acquirer based on said stored data relating character data with code data;
   a storer which stores the received character data or the calculated character data in a first character memory area;
   a character generator which generates a character corresponding to the character data received by said character data receiver or the character data calculated by said character data calculator;

an executer which executes game processing by displaying the character generated by said character generator on said displayer;
a selector which selects predetermined character data out of the character data stored in said first character memory area in response to an operation by a user;
a determiner which determines whether the selected predetermined character data is in a state where the predetermined character data selected by said selector may be transmitted based on a state of a transmission allowable flag which depends on character information data of the selected character;
a code data calculator which calculates code data from the selected predetermined character data when it is determined by said determiner that the selected predetermined character data is in the state where said predetermined character data selected by said selector may be transmitted; and
an outputter which outputs at least the calculated code data.

2. A game controlling method of a game apparatus having a communicator, an imager, a memory device configured to store data relating character data with code data and a displayer, the method comprising:
(a) receiving character data from a connectable predetermined computer via said communicator,
(b) acquiring code data by imaging a predetermined image by said imager, the code data being two dimensions matrix code coded character data,
(c) calculating character data from the code data acquired in (b) based on said stored data relating character data with code data,
(d) storing the received character data or the calculated character data in a first character memory area;
(e) generating a character, via one or more computer processors, corresponding to the character data received in (a) or a character corresponding to the character data calculated in (c),
(f) executing game processing by displaying the character generated in (e) on said displayer;
(g) selecting predetermined character data out of the character data stored in said first character memory area in response to an operation by a user;
(h) determining whether the selected predetermined character data is in a state where the selected predetermined character data may be transmitted based on a state of a transmission allowable flag which depends on character information data of the selected character;
(i) calculating code data from the selected predetermined character data when it is determined by said determining that the selected predetermined character data is in the state where said selected predetermined character data may be transmitted; and
(k) outputting at least the calculated code data.

3. A game system having a game apparatus including a communicator, an imager, a memory device configured to store data relating character data with code data and a displayer, and a predetermined computer which is connectable to said game apparatus, said game apparatus comprising:
a character data receiver which receives character data from said predetermined computer via said communicator;
a code data acquirer which acquires code data by imaging a predetermined image by said imager, the code data being two dimensions matrix code coded character data;
a character data calculator which calculates character data from the code data acquired by said code data acquirer based on said stored data relating character data with code data;
a storer which stores the received character data or the calculated character data in a first character memory area;
a character generator which generates a character corresponding to the character data received by said character data receiver or the character data calculated by said character data calculator;
an executer which executes game processing by displaying the character generated by said character generator on said displayer;
a selector which selects predetermined character data out of the character data stored in said first character memory area in response to an operation by a user;
a determiner which determines whether the selected predetermined character data is in a state where the predetermined character data selected by said selector may be transmitted based on a state of a transmission allowable flag which depends on character information data of the selected character;
a code data calculator which calculates code data from the selected predetermined character data when it is determined by said determiner that the selected predetermined character data is in the state where said predetermined character data selected by said selector may be transmitted; and
an outputter which outputs at least the calculated code data.

4. A non-transitory storage medium storing a game program to be executed by a computer of a game apparatus having a communicator, an imager, a memory device configured to store data relating character data with code data and a displayer, wherein
said game program causes said computer to at least perform:
receiving character data from a predetermined computer connectable to said computer via said communicator;
acquiring code data by imaging a predetermined image by said imager, the code data being two dimensions matrix code coded character data;
calculating character data from the acquired code data based on said stored data relating character data with code data;
storing the received character data or the calculated character data in a first character memory area;
generating a character corresponding to the received character data or the calculated character data;
executing game processing by displaying the generated character on said displayer;
selecting predetermined character data out of the character data stored in said first character memory area in response to an operation by a user;
determining whether the selected predetermined character data is in a state where the selected predetermined character data may be transmitted based on a state of a transmission allowable flag which depends on character information data of the selected character;
calculating code data from the selected predetermined character data when it is determined by said determining that the selected predetermined character data is in the state where said selected predetermined character data may be transmitted; and
outputting at least the calculated code data.

5. The non-transitory storage medium according to claim 4, wherein
said calculating character data
includes decrypting encrypted character data; and
calculating encrypted character data from the acquired code data and calculating character data after said encrypted character data is decrypted.

6. The non-transitory storage medium according to claim 4, wherein said game program causes said computer to perform:
said generating a character corresponding to predetermined character data stored in said first character memory area.

7. The non-transitory storage medium according to claim 6, wherein
said game program causes said computer to further perform:
selecting the predetermined character data out of the character data stored in said first character memory area in response to an operation by a user; and
transmitting to said predetermined computer the selected predetermined character data by using said communicator.

8. The non-transitory storage medium according to claim 7, wherein
said game program causes said computer to perform:
copying the predetermined character data from said first character memory area to a transmittable area when said state determining determines that said predetermined character data is in the state where said selected predetermined character data may be transmitted.

9. The non-transitory storage medium according to claim 6, wherein
said outputting outputs said calculated code data to said displayer.

10. The non-transitory storage medium according to claim 9, wherein
said calculating code data
includes encrypting said selected predetermined character; and
calculating said code data from said encrypted character data.

11. The non-transitory storage medium according to claim 6, wherein
said game program causes said computer to further perform:
generating a character corresponding to at least one character data stored in said first character memory area, and
displaying the generated character on said displayer, wherein
said selecting predetermined character data makes a user select a desired character from the characters displayed on said displayer, and selects, as said predetermined character data, character data corresponding to the desired character that is made to be selected by said user.

12. The non-transitory storage medium according to claim 6, wherein
said computer is connectable with a predetermined external storage medium, and
said game program causes said computer to further perform:
reading character data from said predetermined external storage medium; wherein
said storing the received character data further stores the character data.

13. The non-transitory storage medium according to claim 6, wherein
said game program causes said computer to further perform:
creating a character in response to an operation by a user and storing character data corresponding to the created character in said first character memory area.

14. The non-transitory storage medium according to claim 13, wherein
said creating a character creates said character by using parts prepared in advance.

15. The non-transitory storage medium according to claim 13, wherein
said game program causes said computer to further perform:
transmitting the created character data by utilizing said communicator.

16. The non-transitory storage medium according to claim 13, wherein
said game program causes said computer to further perform:
generating said code data from the created character data; and
displaying the generated code data on said displayer.

17. The non-transitory storage medium according to claim 6, wherein
said storing the received character data stores the received character data in a second character memory area when said computer is in a sleep mode.

18. The non-transitory storage medium according to claim 17, wherein
said game program causes said computer to further perform:
character selecting which selects predetermined character data out of the character data stored in said second character memory area in response to an operation by a user; and
character data moving which moves the selected predetermined character data from said second character memory area to said first character memory area.

19. The non-transitory storage medium according to claim 18, wherein
said character selecting
includes character generating which generates a character corresponding to at least one character data stored in said second character memory area by said storing the character data and character displaying which displays the character generated by said character generating on said displayer, and
makes said user select a desired character from the characters displayed by said character-displaying.

20. The non-transitory storage medium according to claim 4, wherein
said outputting outputs image data corresponding to said code data.

* * * * *